(12) United States Patent
Li et al.

(10) Patent No.: US 12,557,121 B2
(45) Date of Patent: Feb. 17, 2026

(54) METHODS, APPARATUSES, AND COMPUTER READABLE MEDIA FOR SIDELINK RESOURCE SELECTION

(71) Applicant: NOKIA TECHNOLOGIES OY, Espoo (FI)

(72) Inventors: Dong Li, Shanghai (CN); Yong Liu, Shanghai (CN)

(73) Assignee: Nokia Technologies Oy, Espoo (FI)

( * ) Notice: Subject to any disclaimer, the term of this patent is extended or adjusted under 35 U.S.C. 154(b) by 483 days.

(21) Appl. No.: 18/025,525

(22) PCT Filed: Sep. 15, 2020

(86) PCT No.: PCT/CN2020/115293
§ 371 (c)(1),
(2) Date: Mar. 9, 2023

(87) PCT Pub. No.: WO2022/056670
PCT Pub. Date: Mar. 24, 2022

(65) Prior Publication Data
US 2024/0015765 A1    Jan. 11, 2024

(51) Int. Cl.
*H04W 4/00*    (2018.01)
*H04L 5/00*    (2006.01)
*H04W 72/02*    (2009.01)
*H04W 72/25*    (2023.01)
(Continued)

(52) U.S. Cl.
CPC ........... *H04W 72/25* (2023.01); *H04L 5/0023* (2013.01); *H04W 72/02* (2013.01); *H04W 72/40* (2023.01); *H04W 92/18* (2013.01)

(58) Field of Classification Search
None
See application file for complete search history.

(56) References Cited

U.S. PATENT DOCUMENTS

| 11,050,543 B1 * | 6/2021 | Balasubramanian ........................ H04W 76/14 |
| 11,895,622 B2 * | 2/2024 | Yasukawa ............... H04J 13/18 |
| 2006/0063492 A1 | 3/2006 | Iacono et al. |

(Continued)

FOREIGN PATENT DOCUMENTS

| WO | 2017/135998 A1 | 8/2017 |
| WO | 2020/033622 A1 | 2/2020 |

OTHER PUBLICATIONS

International Search Report and Written Opinion dated May 26, 2021 corresponding to International Patent Application No. PCT/CN2020/115293.

(Continued)

*Primary Examiner* — Bob A Phunkulh
(74) *Attorney, Agent, or Firm* — Lippes Mathias LLP

(57) ABSTRACT

Disclosed are apparatuses for sidelink resource selection. An example apparatus may include at least one processor and at least one memory. The at least one processor may include computer program code, and the at least one memory and the computer program code may be configured to, with the at least one processor, cause the apparatus to transmit a first sidelink control signal and at least one sidelink data signal in a first beam direction, and transmit a second sidelink control signal in a second beam direction different from the first beam direction. Related methods and computer readable media are also disclosed.

22 Claims, 13 Drawing Sheets

(51) Int. Cl.
*H04W 72/40* (2023.01)
*H04W 92/18* (2009.01)

(56) References Cited

U.S. PATENT DOCUMENTS

| | | | |
|---|---|---|---|
| 2013/0102345 A1 | 4/2013 | Jung | |
| 2014/0072078 A1 | 3/2014 | Sergeyev et al. | |
| 2018/0199349 A1 | 7/2018 | Hehn et al. | |
| 2018/0309496 A1 | 10/2018 | Lee et al. | |
| 2019/0044667 A1 | 2/2019 | Guo et al. | |
| 2019/0090250 A1 | 3/2019 | Lee et al. | |
| 2019/0124490 A1* | 4/2019 | Wu | H04W 72/12 |
| 2020/0029340 A1 | 1/2020 | He et al. | |
| 2020/0045715 A1 | 2/2020 | Li et al. | |
| 2020/0336253 A1* | 10/2020 | He | H04W 76/11 |
| 2020/0359445 A1* | 11/2020 | Wu | H04W 76/28 |
| 2020/0413295 A1* | 12/2020 | Li | H04W 76/14 |
| 2021/0050931 A1* | 2/2021 | Hahn | H04L 1/0004 |
| 2021/0144691 A1* | 5/2021 | Balasubramanian | H04L 1/1861 |
| 2021/0212051 A1* | 7/2021 | Raghavan | H04W 76/14 |
| 2022/0046631 A1* | 2/2022 | Li | H04L 5/14 |
| 2022/0256524 A1* | 8/2022 | Kwon | H04B 7/0408 |
| 2022/0286184 A1* | 9/2022 | Li | H04B 7/088 |
| 2022/0353846 A1* | 11/2022 | Wang | H04L 1/1861 |
| 2023/0231616 A1* | 7/2023 | Liu | H04B 7/06954 370/329 |
| 2023/0232426 A1* | 7/2023 | Liu | H04B 7/0621 370/330 |

OTHER PUBLICATIONS

"3rd Generation Partnership Project; Technical Specification Group Radio Access Network; NR; Physical layer procedures for data (Release 16)", 3GPP TS 38.214, V16.1.0, Mar. 2020, pp. 1-151.

"3rd Generation Partnership Project; Technical Specification Group Radio Access Network; Study on evaluation methodology of new Vehicle-to-Everything (V2X) use cases for LTE and NR; (Release 15)", 3GPP TR 37.885, V15.3.0, Jun. 2019, pp. 1-38.

"Discussion on sidelink resource allocation mechanism", 3GPP TSG RAN WG1 Meeting #94, R1-1808522, Agenda item: 7.2.4.1.4., LG Electronics, Aug. 20-24, 2018, pp. 1-4.

Extended European Search Report received for corresponding European Patent Application No. 20953531.9, dated May 16, 2024, 8 pages.

\* cited by examiner ered with the same time and frequency resource mapping and transmit power density.

METHODS, APPARATUSES, AND COMPUTER READABLE MEDIA FOR SIDELINK RESOURCE SELECTION

TECHNICAL FIELD

Various embodiments relate to methods, apparatuses, and computer readable media for sidelink resource selection.

BACKGROUND

Sidelink (SL) communications have been introduced in a telecommunication system such as new radio (NR or 5G) system, for example to support vehicle to everything (V2X) services such as vehicle platooning, extended sensors, advanced driving, remote driving, and so on. In some implementations, user equipment (UE) may be configured to select radio resources autonomously from a configured or preconfigured resource pool so as to perform SL communications with one or more another UEs.

SUMMARY

In a first aspect, disclosed is an apparatus including at least one processor and at least one memory. The at least one memory may include computer program code, and the at least one memory and the computer program code may be configured to, with the at least one processor, cause the apparatus to transmit a first sidelink control signal and at least one sidelink data signal in a first beam direction, and transmit a second sidelink control signal in a second beam direction different from the first beam direction.

In some embodiments, the first sidelink control signal and the second sidelink control signal may be configured with substantially the same time and frequency resource mapping and transmit power density.

In some embodiments, the at least one memory and the computer program code may be configured to, with the at least one processor, further cause the apparatus to refrain from transmitting a sidelink data signal associated with the second sidelink control signal in the second beam direction.

In some embodiments, the at least one memory and the computer program code may be configured to, with the at least one processor, further cause the apparatus to transmit a dummy sidelink data signal in the second beam direction.

In some embodiments, the dummy sidelink data signal may span at least one sub-channel in a frequency domain, and the at least one sub-channel may include a frequency span of a physical sidelink control channel for transmitting the first sidelink control signal and may be included in a frequency span of a physical sidelink shared channel for transmitting the at least one sidelink data signal.

In some embodiments, the transmissions in the first beam direction and the second beam direction may be millimeter wave sidelink transmissions.

In some embodiments, the transmission in the first beam direction may include at least one of a beamformed unicast sidelink transmission to a target apparatus and a beamformed groupcast sidelink transmission to multiple target apparatuses.

In some embodiments, the at least one memory and the computer program code may be configured to, with the at least one processor, further cause the apparatus to transmit a demodulation reference signal associated with the second sidelink control signal in the second beam direction.

In a second aspect, disclosed is a method including: transmitting a first sidelink control signal and at least one sidelink data signal in a first beam direction, and transmitting a second sidelink control signal in a second beam direction different from the first beam direction.

In some embodiments, the first sidelink control signal and the second sidelink control signal may be configured with substantially the same time and frequency resource mapping and transmit power density.

In some embodiments, the method may further include refraining from transmitting a sidelink data signal associated with the second sidelink control signal in the second beam direction.

In some embodiments, the method may further include transmitting a dummy sidelink data signal in the second beam direction.

In some embodiments, the dummy sidelink data signal may span at least one sub-channel in a frequency domain, and the at least one sub-channel may include a frequency span of a physical sidelink control channel for transmitting the first sidelink control signal and may be included in a frequency span of a physical sidelink shared channel for transmitting the at least one sidelink data signal.

In some embodiments, the transmissions in the first beam direction and the second beam direction may be millimeter wave sidelink transmissions.

In some embodiments, the transmission in the first beam direction may include at least one of a beamformed unicast sidelink transmission to a target apparatus and a beamformed groupcast sidelink transmission to multiple target apparatuses.

In some embodiments, the method may further include transmitting a demodulation reference signal associated with the second sidelink control signal in the second beam direction.

In a third aspect, disclosed is an apparatus including: means for transmitting a first sidelink control signal and at least one sidelink data signal in a first beam direction, and means for transmitting a second sidelink control signal in a second beam direction different from the first beam direction.

In some embodiments, the first sidelink control signal and the second sidelink control signal may be configured with substantially the same time and frequency resource mapping and transmit power density.

In some embodiments, the apparatus may further include means for refraining from transmitting a sidelink data signal associated with the second sidelink control signal in the second beam direction In some embodiments, the apparatus may further include means for transmitting a dummy sidelink data signal in the second beam direction.

In some embodiments, the dummy sidelink data signal may span at least one sub-channel in a frequency domain, and the at least one sub-channel may include a frequency span of a physical sidelink control channel for transmitting the first sidelink control signal and may be included in a frequency span of a physical sidelink shared channel for transmitting the at least one sidelink data signal.

In some embodiments, the transmissions in the first beam direction and the second beam direction may be millimeter wave sidelink transmissions.

In some embodiments, the transmission in the first beam direction may include at least one of a beamformed unicast sidelink transmission to a target apparatus and a beamformed groupcast sidelink transmission to multiple target apparatuses.

In some embodiments, the apparatus may further include means for transmitting a demodulation reference signal associated with the second sidelink control signal in the second beam direction.

In a fourth aspect, disclosed is a computer readable medium including instructions stored thereon for causing an apparatus to transmit a first sidelink control signal and at least one sidelink data signal in a first beam direction, and transmit a second sidelink control signal in a second beam direction different from the first beam direction.

In some embodiments, the first sidelink control signal and the second sidelink control signal may be configured with substantially the same time and frequency resource mapping and transmit power density.

In some embodiments, the instructions may further cause the apparatus to refrain from transmitting a sidelink data signal associated with the second sidelink control signal in the second beam direction In some embodiments, the instructions may further cause the apparatus to transmit a dummy sidelink data signal in the second beam direction.

In some embodiments, the dummy sidelink data signal may span at least one sub-channel in a frequency domain, and the at least one sub-channel may include a frequency span of a physical sidelink control channel for transmitting the first sidelink control signal and may be included in a frequency span of a physical sidelink shared channel for transmitting the at least one sidelink data signal.

In some embodiments, the transmissions in the first beam direction and the second beam direction may be millimeter wave sidelink transmissions.

In some embodiments, the transmission in the first beam direction may include at least one of a beamformed unicast sidelink transmission to a target apparatus and a beamformed groupcast sidelink transmission to multiple target apparatuses.

In some embodiments, the instructions may further cause the apparatus to transmit a demodulation reference signal associated with the second sidelink control signal in the second beam direction.

In a fifth aspect, disclosed is an apparatus including at least one processor and at least one memory. The at least one memory may include computer program code, and the at least one memory and the computer program code may be configured to, with the at least one processor, cause the apparatus to receive a sidelink control signal for a first sidelink transmission through a first receive beam of a plurality of receive beams, measure a first quality of the received sidelink control signal, receive a sidelink data signal as scheduled by the sidelink control signal for the first sidelink transmission through the first receive beam, measure a second quality of the received sidelink data signal, and select a radio resource for a second sidelink transmission by the apparatus to at least one target apparatus based on at least one of the first quality and the second quality.

In some embodiments, selecting the radio resource for the second sidelink transmission may include: reusing a radio resource reserved by the sidelink control signal for the first sidelink transmission in a case where the first quality is below a first threshold; else selecting another radio resource different from the reserved radio resource.

In some embodiments, in a case where the first quality is above the first threshold, selecting the radio resource for the second sidelink transmission may further include: reusing a radio resource reserved by the sidelink control signal for the first sidelink transmission in a case where a difference between the first quality and the second quality is above a second threshold and the second sidelink transmission is beamformed in a direction different from a direction of the first receive beam; else selecting another radio resource different from the reserved radio resource.

In some embodiments, selecting the radio resource for the second sidelink transmission may further be based on relative positions of an apparatus transmitting the sidelink control signal and the at least one target apparatus.

In some embodiments, the second sidelink transmission and receptions of the sidelink control signal and the sidelink data signal may be millimeter wave sidelink communications.

In some embodiments, the second sidelink transmission may include at least one of a beamformed unicast sidelink transmission to the at least one target apparatus and a beamformed groupcast sidelink transmission to the at least one target apparatus.

In some embodiments, the first quality and the second quality may be reference signal received powers measured over demodulation reference signals associated with the sidelink control signal and the sidelink data signal, respectively.

In a sixth aspect, disclosed is a method including: receiving a sidelink control signal for a first sidelink transmission through a first receive beam of a plurality of receive beams, measuring a first quality of the received sidelink control signal, receiving a sidelink data signal as scheduled by the sidelink control signal for the first sidelink transmission through the first receive beam, measuring a second quality of the received sidelink data signal r, and selecting a radio resource selection for a second sidelink transmission to at least one target apparatus based on at least one of the first quality and the second quality.

In some embodiments, selecting the radio resource for the second sidelink transmission may include: reusing a radio resource reserved by the sidelink control signal for the first sidelink transmission in a case where the first quality is below a first threshold; else selecting another radio resource different from the reserved radio resource.

In some embodiments, in a case where the first quality is above the first threshold, selecting the radio resource for the second sidelink transmission may further include: reusing a radio resource reserved by the sidelink control signal for the first sidelink transmission in a case where a difference between the first quality and the second quality is above a second threshold and the second sidelink transmission is beamformed in a direction different from a direction of the first receive beam; else selecting another radio resource different from the reserved radio resource.

In some embodiments, selecting the radio resource for the second sidelink transmission may further be based on relative positions of an apparatus transmitting the sidelink control signal and the at least one target apparatus.

In some embodiments, the second sidelink transmission and receptions of the sidelink control signal and the sidelink data signal may be millimeter wave sidelink communications.

In some embodiments, the second sidelink transmission may include at least one of a beamformed unicast sidelink transmission to the at least one target apparatus and a beamformed groupcast sidelink transmission to the at least one target apparatus.

In some embodiments, the first quality and the second quality may be reference signal received powers measured over demodulation reference signals associated with the sidelink control signal and the sidelink data signal, respectively.

In a seventh aspect, disclosed is an apparatus including: means for receiving a sidelink control signal for a first sidelink transmission through a first receive beam of a plurality of receive beams, means for measuring a first quality of the received sidelink control signal, means for receiving a sidelink data signal as scheduled by the sidelink control signal for the first sidelink transmission through the first receive beam, means for measuring a second quality of the received sidelink data signal r, and means for selecting a radio resource selection for a second sidelink transmission by the apparatus to at least one target apparatus based on at least one of the first quality and the second quality.

In some embodiments, selecting the radio resource for the second sidelink transmission may include: reusing a radio resource reserved by the sidelink control signal for the first sidelink transmission in a case where the first quality is below a first threshold; else selecting another radio resource different from the reserved radio resource.

In some embodiments, in a case where the first quality is above the first threshold, selecting the radio resource for the second sidelink transmission may further include: reusing a radio resource reserved by the sidelink control signal for the first sidelink transmission in a case where a difference between the first quality and the second quality is above a second threshold and the second sidelink transmission is beamformed in a direction different from a direction of the first receive beam; else selecting another radio resource different from the reserved radio resource.

In some embodiments, selecting the radio resource for the second sidelink transmission may further be based on relative positions of an apparatus transmitting the sidelink control signal and the at least one target apparatus.

In some embodiments, the second sidelink transmission and receptions of the sidelink control signal and the sidelink data signal may be millimeter wave sidelink communications.

In some embodiments, the second sidelink transmission may include at least one of a beamformed unicast sidelink transmission to the at least one target apparatus and a beamformed groupcast sidelink transmission to the at least one target apparatus.

In some embodiments, the first quality and the second quality may be reference signal received powers measured over demodulation reference signals associated with the sidelink control signal and the sidelink data signal, respectively.

In an eighth aspect, disclosed is a computer readable medium including instructions stored thereon for causing an apparatus to: receive a sidelink control signal for a first sidelink transmission through a first receive beam of a plurality of receive beams, measure a first quality of the received sidelink control signal, receive a sidelink data signal as scheduled by the sidelink control signal for the first sidelink transmission through the first receive beam, measure a second quality of the received sidelink data signal, and select a radio resource selection for a second sidelink transmission by the apparatus to at least one target apparatus based on at least one of the first quality and the second quality.

In some embodiments, selecting the radio resource for the second sidelink transmission may include: reusing a radio resource reserved by the sidelink control signal for the first sidelink transmission in a case where the first quality is below a first threshold; else selecting another radio resource different from the reserved radio resource.

In some embodiments, in a case where the first quality is above the first threshold, selecting the radio resource for the second sidelink transmission may further include: reusing a radio resource reserved by the sidelink control signal for the first sidelink transmission in a case where a difference between the first quality and the second quality is above a second threshold and the second sidelink transmission is beamformed in a direction different from a direction of the first receive beam; else selecting another radio resource different from the reserved radio resource.

In some embodiments, selecting the radio resource for the second sidelink transmission may further be based on relative positions of an apparatus transmitting the sidelink control signal and the at least one target apparatus.

In some embodiments, the second sidelink transmission and receptions of the sidelink control signal and the sidelink data signal may be millimeter wave sidelink communications.

In some embodiments, the second sidelink transmission may include at least one of a beamformed unicast sidelink transmission to the at least one target apparatus and a beamformed groupcast sidelink transmission to the at least one target apparatus.

In some embodiments, the first quality and the second quality may be reference signal received powers measured over demodulation reference signals associated with the sidelink control signal and the sidelink data signal, respectively.

BRIEF DESCRIPTION OF THE DRAWINGS

Some embodiments will now be described, by way of non-limiting examples, with reference to the accompanying drawings. In the drawings, the same reference numbers may be used throughout to refer to similar or substantially the same elements, components, parts, modules, units, operations, conditions, signals, operations, connections, and so on, which may appear in multiple drawings.

DETAILED DESCRIPTION

When the UE is configured to select autonomously radio resources for the SL communications, for example, the UE may be configured to receive (or sense) a SL control signal on a physical SL control channel (PSCCH) during a sensing window, and may decode the received SL control signal so as to acquire control information on one or more of: a resource reservation interval, after which for example a radio resource in the resource pool is indicated as a reserved resource; a radio resource allocation for an associated physical SL shared channel (PSSCH); a pattern for the demodulation reference signals of the PSSCH; and so on. Then, the UE may measure either a quality of the PSCCH and/or a quality of the PSSCH as per higher layer signaling configurations. For example, the UE may measure a reference signal received power (RSRP) of the PSCCH based on a demodulation reference signal (DMRS) associated with the SL control signal received via the PSCCH, or may measure a RSRP of the PSSCH based on a DMRS associated with a SL data signal received via the PSSCH. Then, during a selection window, for example triggered at the beginning of a slot, the UE may select either the reserved resource or another resource from the resource pool based on the measured RSRP of the PSCCH or PSSCH, so as to perform one or more SL communications with its one or more target UEs.

In a case where the SL communications are performed with a high frequency band such as a millimeter-wave frequency band (e.g. 24.25 GHz-52.60 GHz in NR systems), beamformed communications may be applied, such as beamformed unicast communications and beamformed groupcast communications. For example, as illustrated in FIG. 1, for UEs 110 and 112 (e.g. vehicles travelling along a lane of a road 100 in a direction 102) and UEs 114 and 116 (e.g. vehicles travelling along a neighboring lane of the road 100 in the direction 102), the UE 110 may transmit one or more SL control signals (e.g. via PSCCH) and one or more SL data signals (e.g. via PSSCH) to its target UE 112 in a beamformed transmission 120 (e.g. a beamformed unicast or a beamformed groupcast) for example through a backward antenna panel (e.g. antenna array) installed on the UE 110, while the UE 114 is sensing the PSCCH and measuring the qualities e.g. RSRP so as to determine the availability of a radio resource for a SL transmission to its target UE 116.

Figure 1:
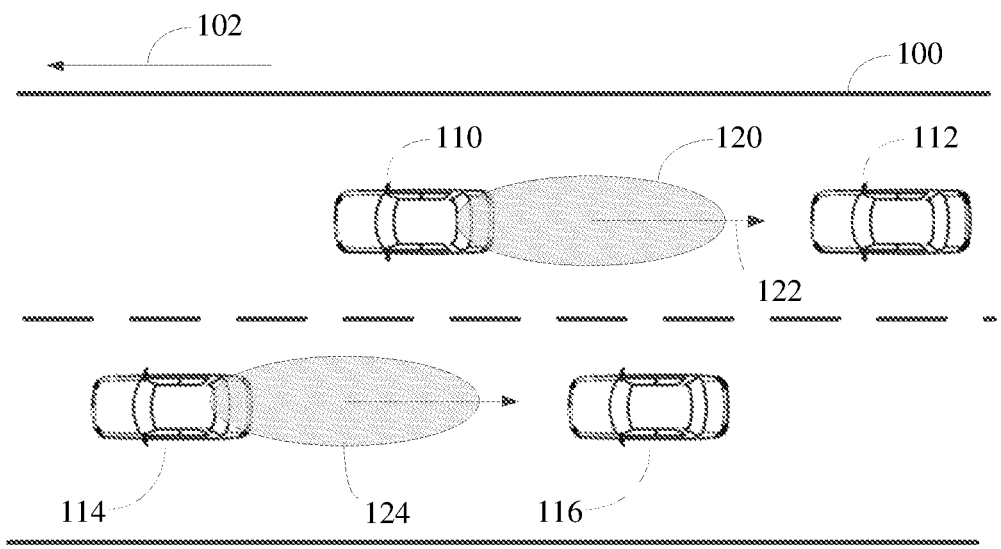
FIG. 1 illustrates an example scenario of SL communication in an embodiment.

As illustrated in FIG. 1, a beam direction 122 of the beamformed transmission 120 is towards the UE 112 behind the UE 110, so that the UE 114 in front of the UE 110 may fail to receive the SL control signal from the UE 110 and may fail to determine the resources used by the UE 110. Thus, the radio resources selected by the UE 114 for a beamformed transmission 124 to the UE 116 in substantially the same beam direction as the beam direction 122 may be the same resources as those used for the beamformed transmission 120, which may result in collision interferences. For example, the UE 110 may interfere with the UE 116 and the UE 114 may interfere with the UE 112.

Figure 2:
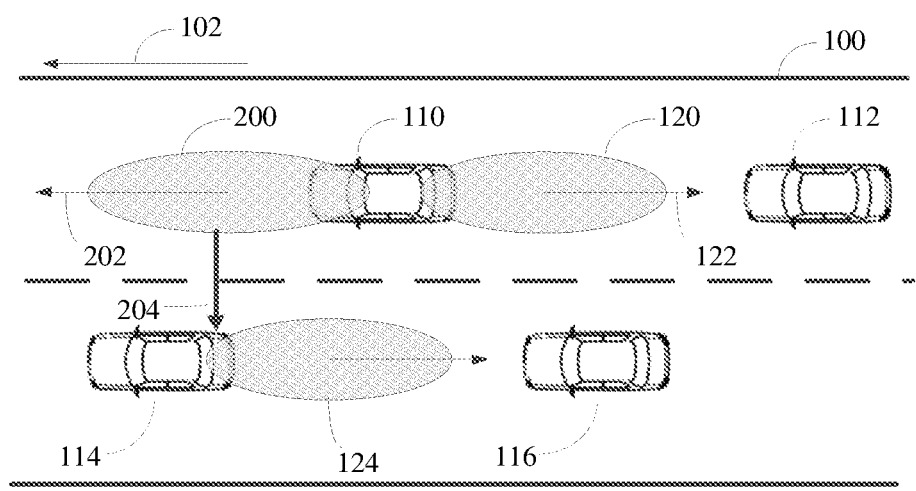
FIG. 2 illustrates an example scenario of SL communication in an embodiment.

In an embodiment, in addition to transmitting one or more SL control signals (e.g. via PSCCH) and one or more SL data signals (e.g. via PSSCH) associated with the SL communication service to the target UE 112 through the beamformed transmission 120 in the beam direction 122, the UE 110 may be further configured to transmit at least one signal associated with the SL communication between the UE 110 and its target UE 112 through at least one another beamformed transmission which has a different beam direction from the beam direction 122. For example, as illustrated in FIG. 2, during or in parallel with the beamformed transmission 120 in the beam direction 122, the UE 110 may also transmit another signal associated with the beamformed transmission 120 through a beamformed transmission 200 in a beam direction 202 opposite to the beam direction 122, for example without pointing to a target, so that other UEs such as the UE 114 may receive this another signal associated with the beamformed transmission 120 from the UE 110 to the target UE 112 (as illustrated by the arrow 204 in FIG. 2) and may select suitable SL radio resources for their respective SL communications without collision interferences with the resources used for the beamformed transmission 120.

Herein, for convenience of description, the signals associated with the SL communication (e.g. the signals transmitted via the beamformed transmission 120) which are transmitted from a UE (e.g. the UE 110) to its at least one target UE (e.g. the UE 112) may also be referred to as first SL signals, and the signal for assistance in sensing (e.g. the signal transmitted via the beamformed transmission 200), which is transmitted from the UE (e.g. the UE 110) in one or more beam directions (e.g. the beam direction 202) different from the beam directions (e.g. the beam direction 122) to the at least one target UE (e.g. the UE 112), may also be referred to as a second SL signal.

Figure 3:
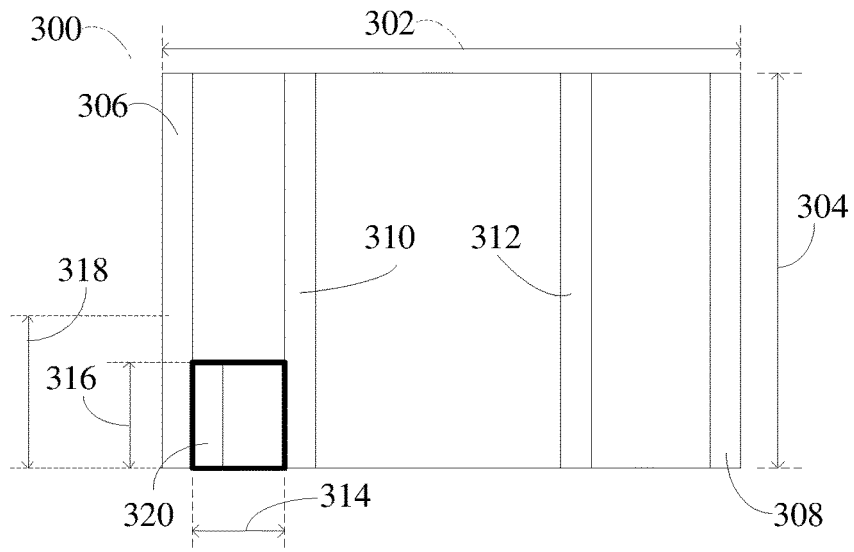
FIG. 3 illustrates an example time and frequency resource mapping for transmitting SL signals associated with an SL communication service in an embodiment.

FIG. 3 illustrates an example channel structure 300 of the PSCCH and PSSCH (or time and frequency resource mapping) for transmitting the first SL signal in an embodiment.

As illustrated in FIG. 3, in the example channel structure 300, the PSSCH for transmitting a SL data signal of the first SL signal may span a PSSCH duration 302 (e.g. one slot) in time domain and a PSSCH bandwidth 304 in frequency domain. A part 306 (e.g. one symbol) for automatic gain control (AGC) at the head of the PSSCH duration 302, a part 308 for guard time at the rear of the PSSCH duration 302, and two parts 310 and 312 for demodulation reference signals (DMRS) associated with the SL data signal, may be included.

Further, as illustrated in FIG. 3, the PSCCH for transmitting a SL control signal of the first SL signal for scheduling the SL data signal of the first SL signal may span a PSCCH duration 314 (e.g. between the parts 306 and 310) in time domain and a PSCCH bandwidth 316 in frequency domain which for example may be not more than one sub-channel bandwidth 318. As illustrated in FIG. 3, the PSCCH for transmitting the SL control signal of the first SL signal may also include a part 320 for DMRS associated with the SL control signal of the first SL signal.

It is appreciated that the channel structure (or the time and frequency resource mapping) for transmitting the first SL signal is not limited to the example as illustrated in FIG. 3, and any suitable structure may be adopted in various embodiments.

In an embodiment, the second SL signal may include a SL control signal. For example, the SL control signal of the second SL signal may be configured with substantially the same time and frequency resource mapping as those of the SL control signal of the first SL signal. For example, the SL control signal of the second SL signal may be configured with substantially the same transmit power density as that of the SL control signal of the first SL signal. For example, the SL control signal of the second SL signal may be configured to include substantially the same information as those in the SL control signal of the first SL signal. For example, the SL control signal of the second SL signal and the SL control signal of the first SL signal may be configured in substantially the same manner and may be transmitted in different beam directions.

Figure 4:
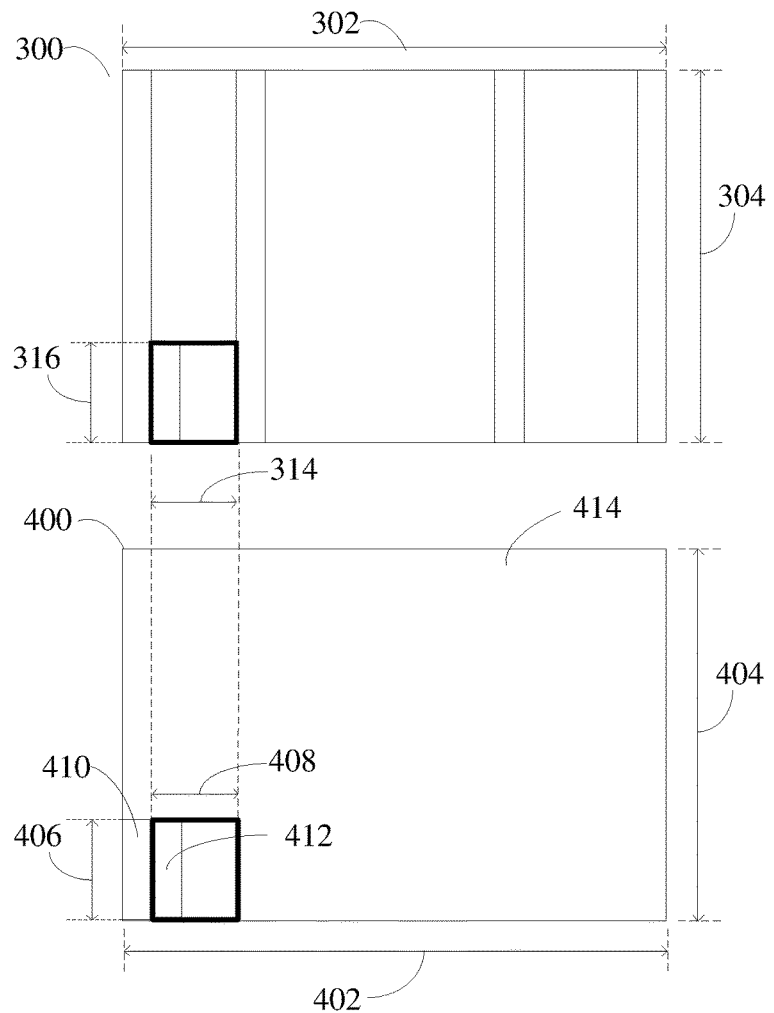
FIG. 4 illustrates an example time and frequency resource mapping for an SL signal for assist in sensing in an embodiment.

FIG. 4 illustrates an example channel structure 400 (or time and frequency resource mapping) for transmitting the second SL signal in this embodiment, which may span a PSSCH duration 402 (e.g. one slot) in time domain which is substantially the same as the PSSCH duration 302, and a PSSCH bandwidth 404 in frequency domain which is substantially the same as the PSSCH bandwidth 304.

In the example channel structure 400, the PSCCH for transmitting the SL control signal of the second SL signal may span a PSCCH duration 408 in time domain which may be substantially the same as the duration 314, and a PSCCH bandwidth 406 in frequency domain which may be substantially the same as the PSCCH bandwidth 316. Further, as illustrated in FIG. 4, a part 410 (e.g. a symbol) for automatic gain control (AGC) and a part 412 for DMRS associated with the SL control signal of the second SL signal may be included. Further, as illustrated in FIG. 4, the other part 414 in the example channel structure 400 may be left unused/empty, for example by configuring zero/null frequency samples for the corresponding resource elements (i.e. zero-power resource elements).

In another embodiment, the second SL signal may further include at least one dummy SL data signal which, for example, may span one sub-channel and substantially the same number of symbols as the SL data signal of the first SL signal. In another embodiment, the second SL signal may further include at least one dummy SL data signal which, for example, may have the same frequency span as the PSCCH for transmitting the SL control signal of the second SL signal and substantially the same number of symbols as the SL data signal of the first SL signal. For example, the dummy signal may be any suitable symbols generated randomly, such as quadrature phase shift keying (QPSK) symbols generated randomly or pseudo-randomly, and may be configured so that no DMRS is associated with the dummy signal of the second SL signal. Further, for example, the dummy SL data signal may be transmitted with substantially constant transmit power.

Figure 5:
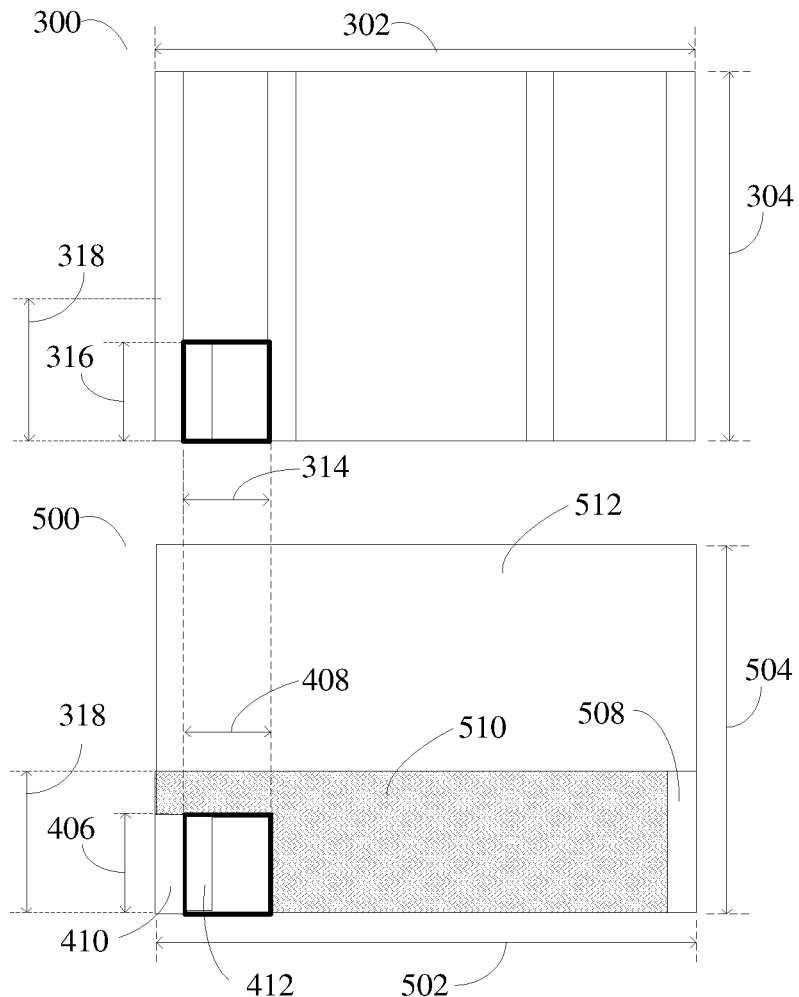
FIG. 5 illustrates another example time and frequency resource mapping for an SL signal for assist in sensing in an embodiment.

FIG. 5 illustrates another example channel structure 500 (or time and frequency resource mapping) for transmitting the second SL signal in this embodiment, which may span a PSSCH duration 502 (e.g. one slot) in time domain which may be substantially the same as the PSSCH duration 302, and a PSSCH bandwidth 504 in frequency domain which may be substantially the same as the PSSCH bandwidth 304.

The PSCCH for transmitting the SL control signal of the second SL signal in the example channel structure 500 may be similar to that in the example channel structure 400, details of which are thus not repeated. Different from the example channel structure 400, the example channel structure 500 may include a part 510 of PSSCH for transmitting the dummy SL data signal of the second SL signal which may span almost the whole SL transmission duration (the PSSCH duration 502) and one sub-channel bandwidth 318. The other part 512 of the PSSCH may be left unused/empty.

The radio resources occupied by the example channel structure 400 may be less than that of the example channel structure 500, while the example channel structure 500 may facilitate signal processing by providing a complete signal structure.

It is appreciated that the channel structure (or the time and frequency resource mapping) for transmitting the second SL signal is not limited to the example as illustrated in FIG. 4 or FIG. 5, and any suitable structure may be adopted in various embodiments. For example, the second SL signal may include at least one dummy SL data signal, and the at least one dummy SL data signal may span at least one sub-channel in the frequency domain where the at least one sub-channel may include a frequency span of the PSCCH for transmitting the SL control signal of the first SL signal and may be included in a frequency span of the PSSCH for transmitting the at least one SL data signal of the first SL signal. For example, the number of sub-channels configured for transmitting the dummy SL data signal may be greater than or equal to the number of sub-channels configured for the transmission of the SL control signal of the first or second SL signal, and may be less than the number of sub-channels configured for the transmission of the SL data signal of the first SL signal.

Figure 6:
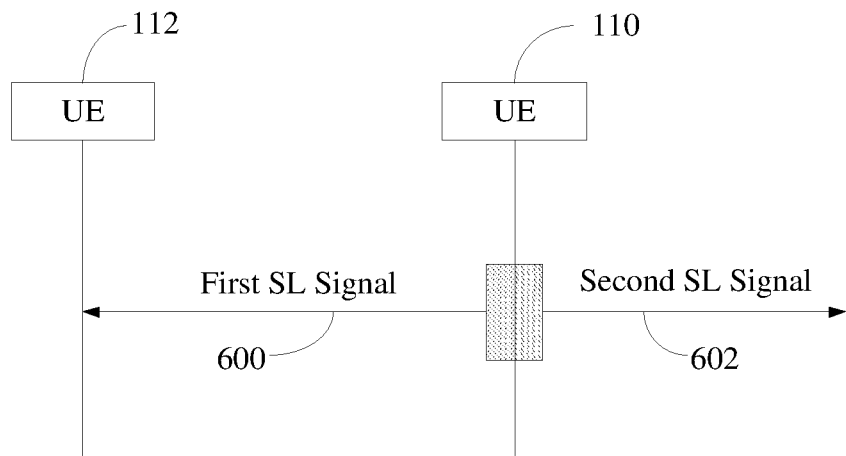
FIG. 6 illustrates an example procedure of transmitting SL signals by a UE performing an SL communication with a target UE.

Then, as illustrated in FIG. 6, the UE 110 may transmit, to its target UE 112, a first SL signal 600 including a SL control signal via the PSCCH and at least one SL data signal via the PSSCH, for example through the beamformed transmission 120 in the beam direction 122 as illustrated in FIG. 1 or FIG. 2. For example, the channel structure for transmitting the first SL signal may be as illustrated in FIG. 3. In addition, the UE 110 may transmit a second SL signal 602 in a beam direction different from that of transmitting the first SL signal 600, for example including the beam direction 202 of the beamformed transmission 200 as illustrated in FIG. 2. For example, the channel structure for transmitting the second SL signal may be as illustrated in FIG. 4 or FIG. 5.

Further, other UEs such as the UE 114 and the UE 116 may be configured to sense or receive a SL control signal through one or more receive beams and to measure signal qualities (e.g. RSRPs) of both PSCCH and PSSCH, so as to determine a radio resource selection of a SL transmission to their respective target UEs based on the received SL control signal and the measured qualities.

Figure 7:
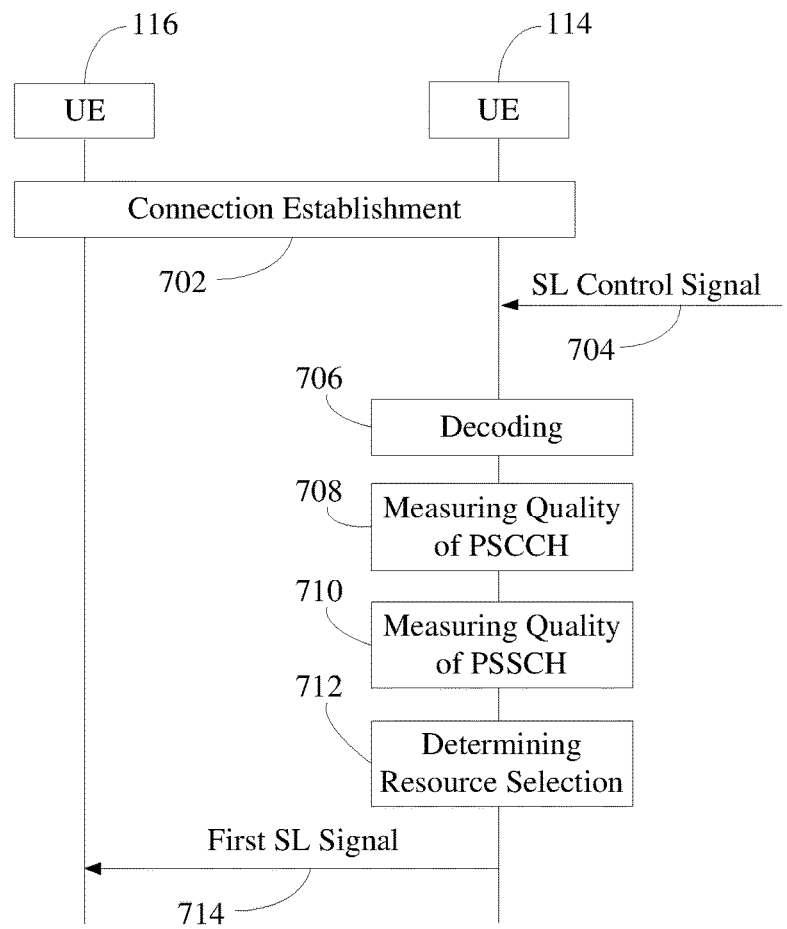
FIG. 7 illustrates an example procedure in a UE expecting to perform an SL communication with a target UE.

For the example scenario as illustrated in FIG. 2, and as illustrated in FIG. 7, after a connection establishment procedure 702 between the UE 114 and the UE 116, the UE 114 may sense or attempt to receive a sidelink control signal through one or more receive beams.

If a SL control signal 704 is received, the UE 114 may perform an operation 706 to decode the received SL control signal 704. In the example scenario as illustrated in FIG. 2, for example, the SL control signal 704 received may include the SL control signal of the second SL signal transmitted by the UE 110 via the beamformed transmission 200 in the beam direction 202. Then, based on the received SL control signal 704, through the operation 706, the UE 114 may determine information for example on radio resources scheduled/reserved by the UE 110 (e.g. for the SL transmission to the UE 112).

Herein, for a UE which is performing a beamformed transmission to its one or more target UEs and may be sensed by one or more another UEs (thus also called as a transmitting UE herein), a beam for a beamformed transmission from the UE to its target UE may be also referred to as a transmit beam of the UE. For a sensing UE which is expecting to perform a beamformed transmission to one or more its target UEs, a beam for receiving the beamformed transmission from another UE, which is carrying SL control signal received by the sensing UE (e.g. the received SL control signal 704), may also be referred to as a receive beam of the sensing UE. Further, in a case where no confusion may be caused, a transmit beam or a receive beam of a UE may be referred to simply as a beam herein.

Further, for a receive beam and a transmit beam of a UE, the directions of the receive beam and the transmit beam may be similar or substantially the same, or the SL transmission of the UE is beamformed in a direction similar to or substantially the same as the direction of the receive beam of the UE, for example in a case where an angle of the two beams is 0°, or in a case where the antenna panel for receiving or sensing a SL signal through the receive beam and the antenna panel for transmitting or emitting a SL signal through the transmit beam are pointing in similar or substantially the same directions (e.g. a difference between the directions or orientations of the two antenna panel is below a threshold), or in a case where the antenna panel for receiving or sensing the SL signal through the receive beam and the antenna panel for transmitting or emitting the SL signal through the transmit beam are the same antenna panel (e.g. with the same antenna panel identity).

For example, for the example scenario as illustrated in FIG. 2, a SL signal is transmitted via the beamformed transmission 124 of the UE 114 (or a transmit beam of the UE 114) by a back antenna panel of the UE 114, and the SL signal transmitted through the beam of the beamformed transmission 200 of the UE 110 is sensed or received also by the same back antenna panel of the UE 114. Thus, the direction of the transmit beam for the beamformed transmission 124 of the UE 114 is similar to or substantially the same as the direction of the receive beam of the UE 114 corresponding to the transmit beam for the beamformed transmission 200 of the UE 110, or the beamformed transmission 200 from the UE 114 to the UE 116 is beamformed in a direction similar to or substantially the same as the direction of the receive beam of the UE 114 through which the SL control signal 704 is sensed or received.

On the other hand, the directions of the receive beam and the transmit beam of the UE may be different, or the SL transmission of the UE is beamformed in a direction different from the direction of the receive beam of the UE, for example in a case where the angle of the two beams is not 0° (e.g., +/−90°, 180°), or in a case where the antenna panel for receiving or sensing a SL signal from a transmitting UE through a receive beam and the antenna panel for transmitting or emitting a SL signal to a target UE through a transmit beam are pointing in different directions (e.g. a difference between the directions or orientations of the two antenna panel is above a threshold), or in a case where the antenna panel for receiving or sensing a SL signal from a transmitting UE through a receive beam and the antenna panel for transmitting or emitting a SL signal to a target UE through a transmit beam are different antenna panels (e.g. with different antenna panel identities).

Further, as illustrated in FIG. 7, the UE 114 may measure a quality of the received SL control signal 704 in an operation 708. For example, in the operation 708, the UE 114 may measure a RSRP of the received SL control signal 704 based on the associated DMRS.

Also, based on the received SL control signal 704, in the operation 706, the UE 114 may determine information for example on a SL data signal which is scheduled by the SL control signal 704 and is associated with a current SL beamformed transmission. Also, based on the received SL control signal 704, the UE 114 may determine further radio resources reserved for a further SL beamformed transmission.

Further, as illustrated in FIG. 7, in an operation 710, the UE 114 may measure a quality of a SL data signal received through the same receive beam as the beam through which the SL control signal 704 is received. For example, if the second SL signal transmitted by the UE 110 via the beam 200 in the beam direction 202 adopts a channel structure without SL data signal as illustrated in FIG. 4, then in the operation 710, the measured quality (e.g. RSRP) of the SL data signal received through the receive beam of the beamformed reception of the UE 114 (corresponding to the transmit beam of the beamformed transmission 200 of the UE 110) may be determined as zero or a very low value. If the second SL signal transmitted by the UE 110 via the beam 200 in the beam direction 202 adopts a channel structure including a dummy SL data signal without DMRS as illustrated in FIG. 5, then in the operation 710, the measured quality (e.g. RSRP) of the SL data signal received through the receive beam of the beamformed reception of the UE 114 may be also determined as zero or a very low value.

Thus, for the example scenario as illustrated in FIG. 2, the measured quality in the operation 708 may be much larger than the measured quality in the operation 710, or a difference between the measured quality in the operation 708 and the measured quality in the operation 710 is above a predetermined threshold (for example a threshold predetermined or configured by the network). Then, in the operation 712, the UE 114 may determine that reusing the reserved radio resources as indicated by the SL control signal 704 may result in collision interferences, and thus the reserved radio resources as indicated by the SL control signal 704 may be excluded by the UE 114 when the UE 114 select radio resources from the resource pool for the SL communication with the UE 116.

Then, as illustrated in FIG. 7, the UE 114 may transmit a first SL signal 714 to its target UE 116 for example through the transmission beam 124 as illustrated in FIG. 2 by using the radio resources selected in the operation 712, without collision interferences with the SL communication between the UE 110 and UE 112.

Figure 8:
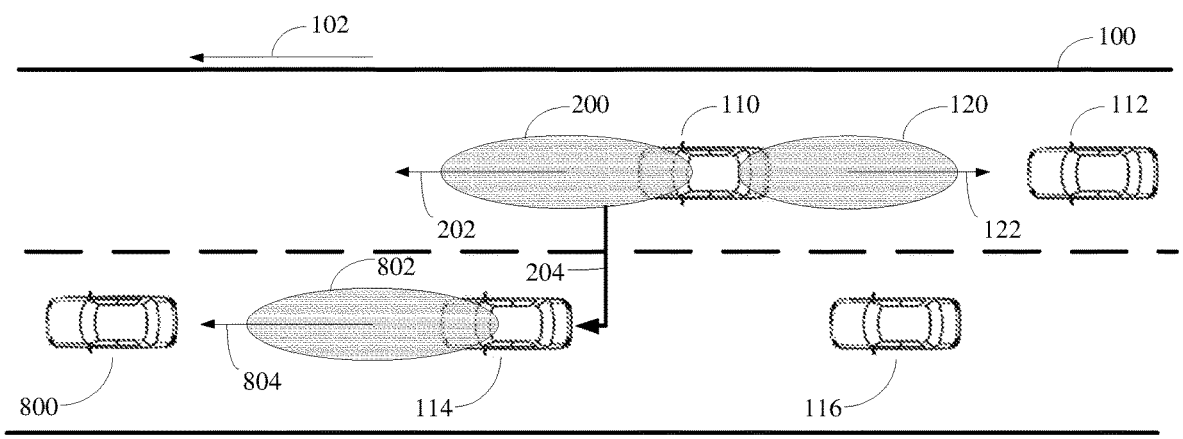
FIG. 8 illustrates an example scenario of SL communication in an embodiment.
Figure 9:
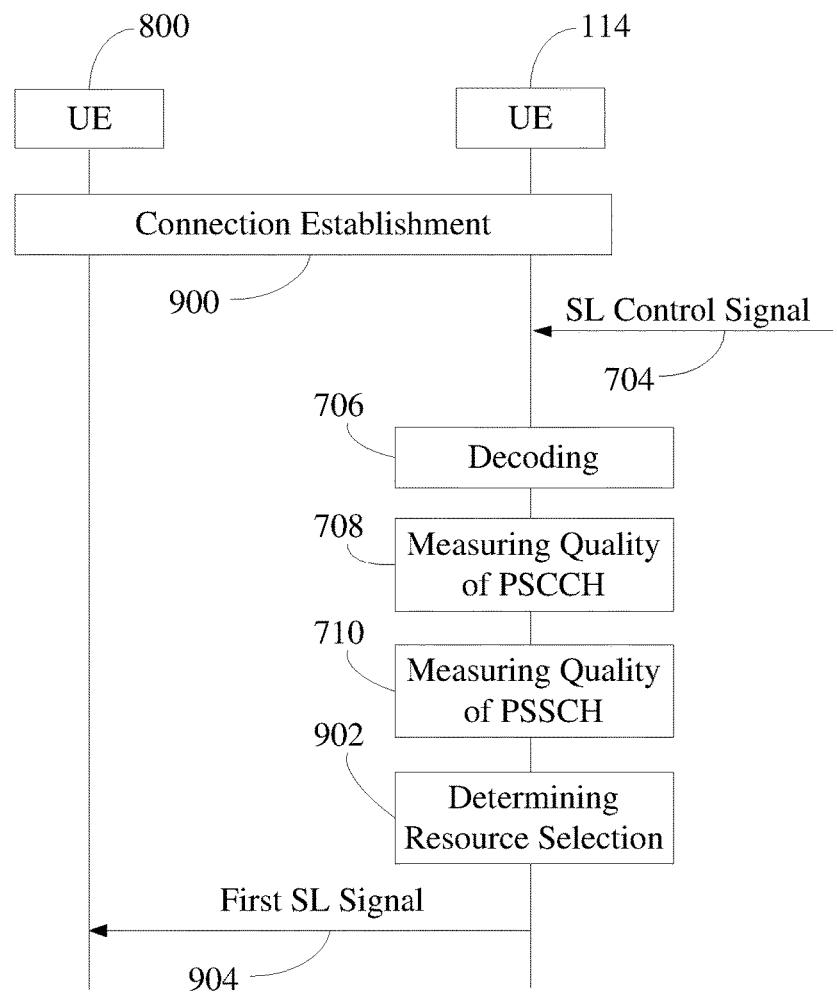
FIG. 9 illustrates an example procedure in a UE expecting to perform an SL communication with a target UE.

In another example scenario as illustrated in FIG. 8 where the UE 114 expects to perform a SL communication with another target UE 800 in front of the UE 114, as illustrated in FIG. 9, after a connection establishment procedure 900 between the UE 114 and the UE 800, the UE 114 may perform the operations 706, 708, and 710. Assuming that the SL control signal 704 received in FIG. 9 includes the SL control signal of the second SL signal transmitted by the UE 110 via the beam 200 in the beam direction 202, then for the example scenario as illustrated in FIG. 8, the measured quality in the operation 708 by the UE 114 may be much larger than the measured quality in the operation 710 by the UE 114.

Different from the example scenario as illustrated in FIG. 2, in the example scenario as illustrated in FIG. 8, the UE 114 may determine that the SL transmission to the target UE 800 will be beamformed in a beam direction different from the beam direction of the receive beam through which the SL control signal 704 is received. For example, as illustrated in FIG. 8, the beamformed transmission 802 from the UE 114 to the UE 800 is performed by a front antenna panel of the UE 114 in a beam direction 202 towards the front of the UE 114, while the SL control signal is received by the UE 114 through the rear antenna panel of the UE 114. Then, in the operation 902, the UE 114 may determine that reusing the reserved radio resources as indicated by the SL control signal 704 will not result in collision interferences, and thus the reserved radio resources as indicated by the SL control signal 704 may be reused by the UE 114 when the UE 114 selects radio resources from the resource pool for the SL communication with the UE 116.

Then, as illustrated in FIG. 9, the UE 114 may transmit a first SL signal 904 to its target UE 800 for example through the transmission beam 802 as illustrated in FIG. 8 by using the radio resources selected in the operation 902, without collision interferences with the SL communication between the UE 110 and the UE 112.

Figure 10:
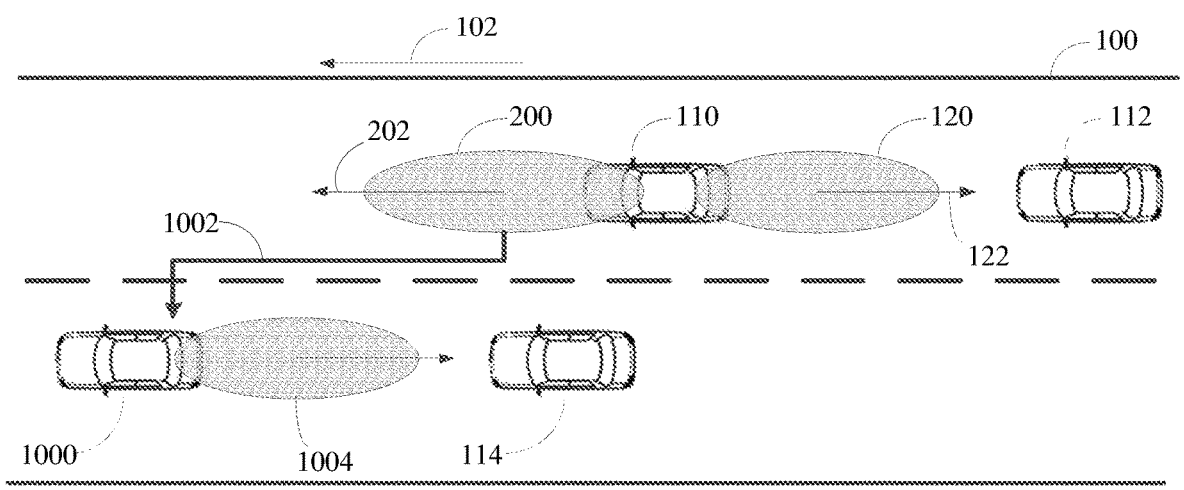
FIG. 10 illustrates an example scenario of SL communication in an embodiment.
Figure 11:
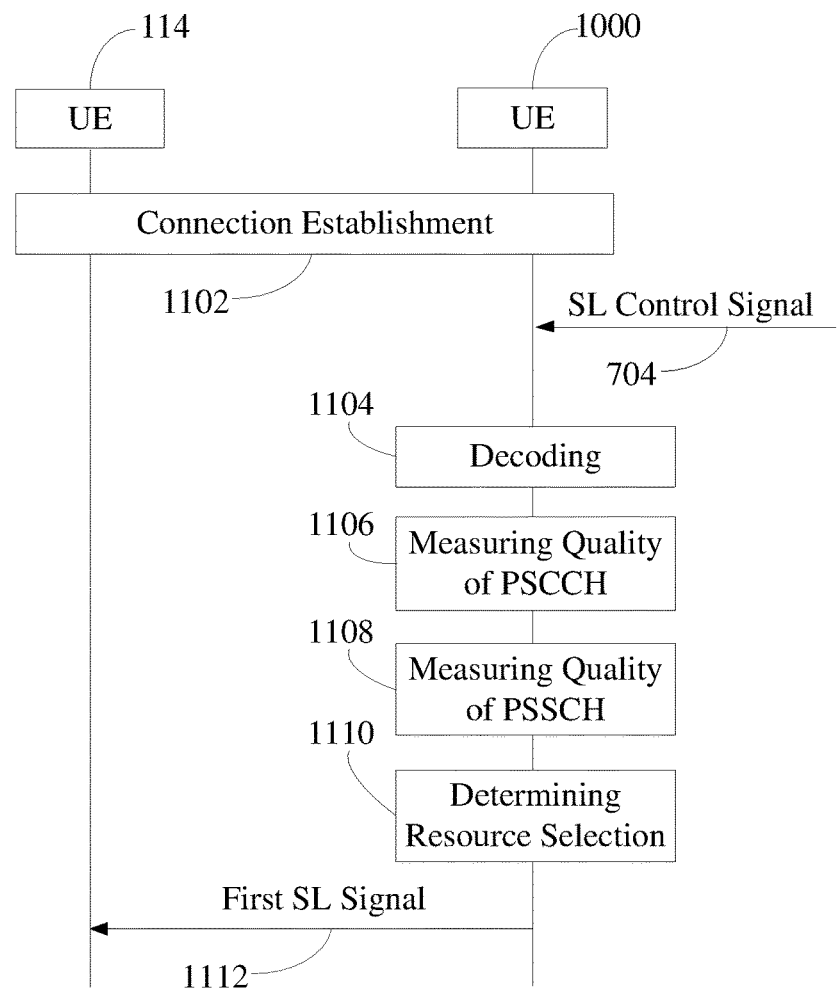
FIG. 11 illustrates an example procedure in a UE expecting to perform an SL communication with a target UE.

In another example scenario as illustrated in FIG. 10 where a UE 1000 in front of the UE 114 expects to perform a SL communication with the UE 114, as illustrated in FIG. 11, after a connection establishment procedure 1102 between the UE 1000 and the UE 114, the UE 1000 may perform operations 1104, 1106, and 1108 which may be similar to the operations 706, 708, and 710, respectively. Assuming that the SL control signal 704 received includes the SL control signal of the second SL signal transmitted by the UE 110 via the beam 200 in the beam direction 202, then for the example scenario as illustrated in FIG. 10, the measured quality in the operation 1106 by the UE 1000 may be much larger than the measured quality in the operation 1108 by the UE 1000.

In the example scenario as illustrated in FIG. 10, the UE 1000 may determine that the SL transmission to the target UE 114 will be beamformed in a direction substantially the same as a direction of the receive beam through which the SL control signal 704 is received. For example, as illustrated in FIG. 10, the beamformed transmission 1004 from the UE 1000 to the UE 114 is from the rear antenna panel of the UE 1000, and the SL control signal is also received by the UE 1000 from the rear antenna panel of the UE 1000.

For example, the UE 1000 may obtain information on positions of other UEs (e.g. information on absolute positions of the other UEs such as the longitudes and latitudes of respective UEs, information on relative positions among respective UEs) for example based on information broadcasted (e.g. periodically) from respective UEs which expect to perform SL communications. Then, the UE 1000 may determine relative position relationships between the UE 1000 and other UEs based on the obtained information, based on which the UE 1000 may further determine that the UE 114 may be within a possible scope of a beamformed transmission from the UE 1000 while the UE 110 is outside of the scope, or the UE 1000 may perform a beamformed transmission with a suitable transmit power so that the UE 114 is within a scope of the beamformed transmission while the UE 110 is not. Thus, in the operation 1110, the UE 1000 may determine that reusing the reserved radio resources as indicated by the SL control signal 704 will not result in collision interferences, and thus the reserved radio resources as indicated by the SL control signal 704 may be reused by the UE 1000 when the UE 1000 selects radio resources from the resource pool for the SL communication with the UE 114.

Then, as illustrated in FIG. 11, the UE 1000 may transmit a first SL signal 1112 to its target UE 114 for example through the transmission beam 1004 as illustrated in FIG. 10 by using the radio resources selected in the operation 1110, without collision interferences with the SL communication between the UE 110 and the UE 112.

Figure 12:
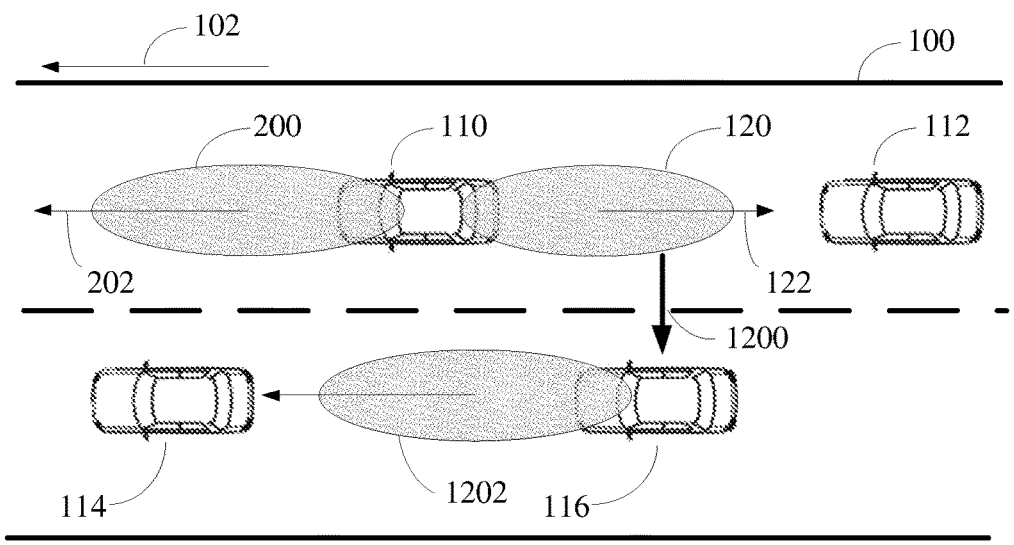
FIG. 12 illustrates an example scenario of SL communication in an embodiment.
Figure 13:
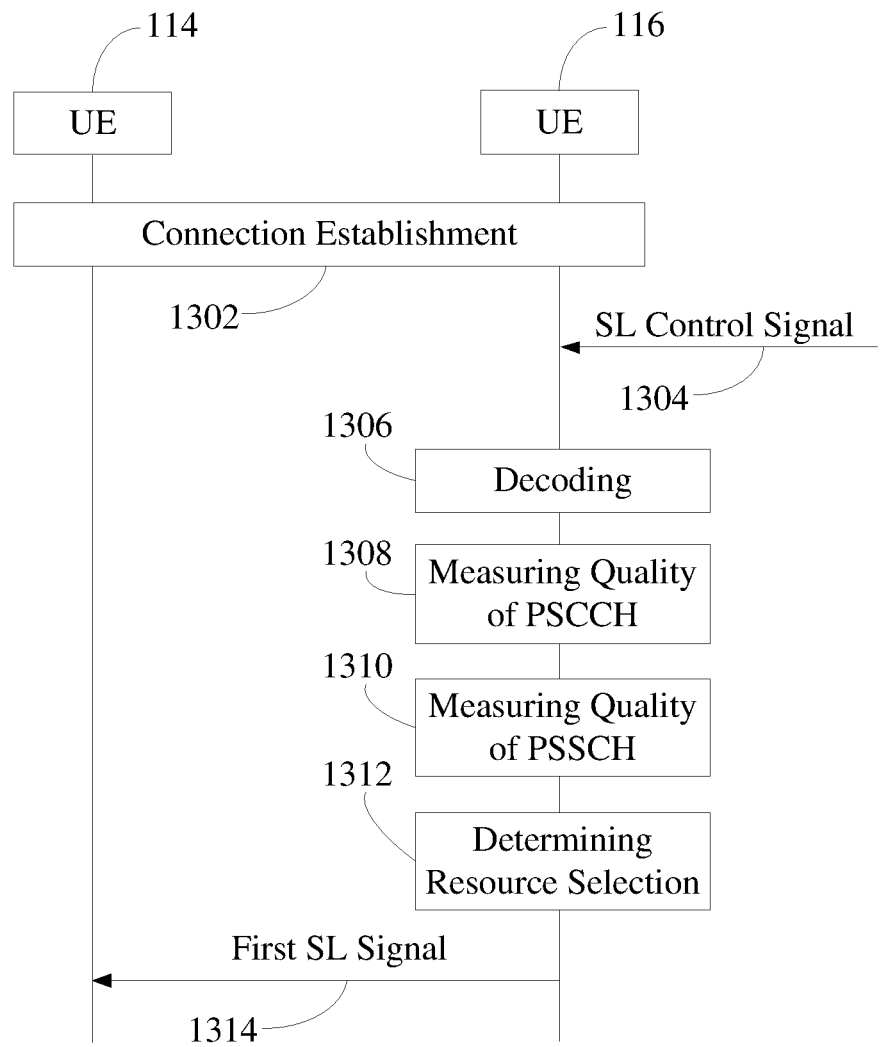
FIG. 13 illustrates an example procedure in a UE expecting to perform an SL communication with a target UE.

In another example scenario as illustrated in FIG. 12 where the UE 116 behind the UE 114 expects to perform a SL communication with the UE 114, as illustrated in FIG. 13, after a connection establishment procedure 1302 between the UE 116 and the UE 114, the UE 116 may receive a SL control signal through one or more receive beams.

As illustrated by the arrow 1200 in FIG. 12, for example, an SL control signal 1304 received by the UE 116 may include the SL control signal of the first SL signal transmitted by the UE 110 via the beam 120 in the beam direction 122. Then, based on the received SL control signal 1304, through the operation 1306, the UE 116 may determine information for example on radio resources reserved by the UE 110 (e.g. for the SL transmission with the UE 112).

Further, the quality (e.g. RSRP) of the received SL control signal 1304 of the first SL signal from the UE 110 may be measured in the operation 1308 for example based on the DMRS associated with the SL control signal 1304 of the first SL signal.

Also, based on the received SL control signal 1304, in the operation 1306, the UE 116 may determine information for example on a SL data signal which is scheduled by the SL control signal 1304 and is associated with a current SL beamformed transmission. Also, based on the received SL control signal 1304, the UE 114 may determine further radio resources reserved for a further SL beamformed transmission.

Then, the quality (e.g. RSRP) of the SL data signal of the first SL signal from the UE 110 may also be measured in the operation 1310 for example based on the DMRS associated with the SL data signal of the first SL signal. The two qualities measured respectively in the operations 1308 and 1310 may be similar, or a difference between the two measured qualities may be below a predetermined threshold which for example may be configured in the network.

Further, based on the information on positions of the UE 110 and UE 114 relative to the UE 116, the UE 116 may determine that the UE 110 is between the UE 114 and the UE 116, and thus reusing the reserved radio resources as indicated by the SL control signal 1304 may result in collision interferences. Then, in the operation 1312, the reserved radio resources as indicated by the SL control signal 1304 may be excluded by the UE 116 when the UE 116 selects radio resources from the resource pool for SL communication with the UE 114.

Then, as illustrated in FIG. 13, the UE 116 may transmit a first SL signal 1314 to its target UE 114 for example through the transmission beam 1202 as illustrated in FIG. 12 by using the radio resources selected in the operation 1304, without collision interferences with the SL communication between the UE 110 and UE 112.

Figure 14:
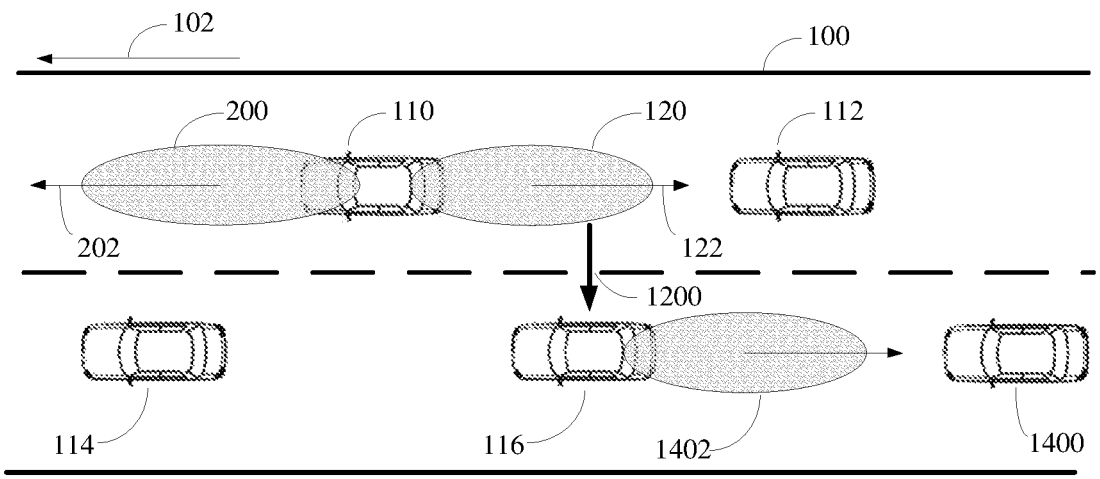
FIG. 14 illustrates an example scenario of SL communication in an embodiment.
Figure 15:
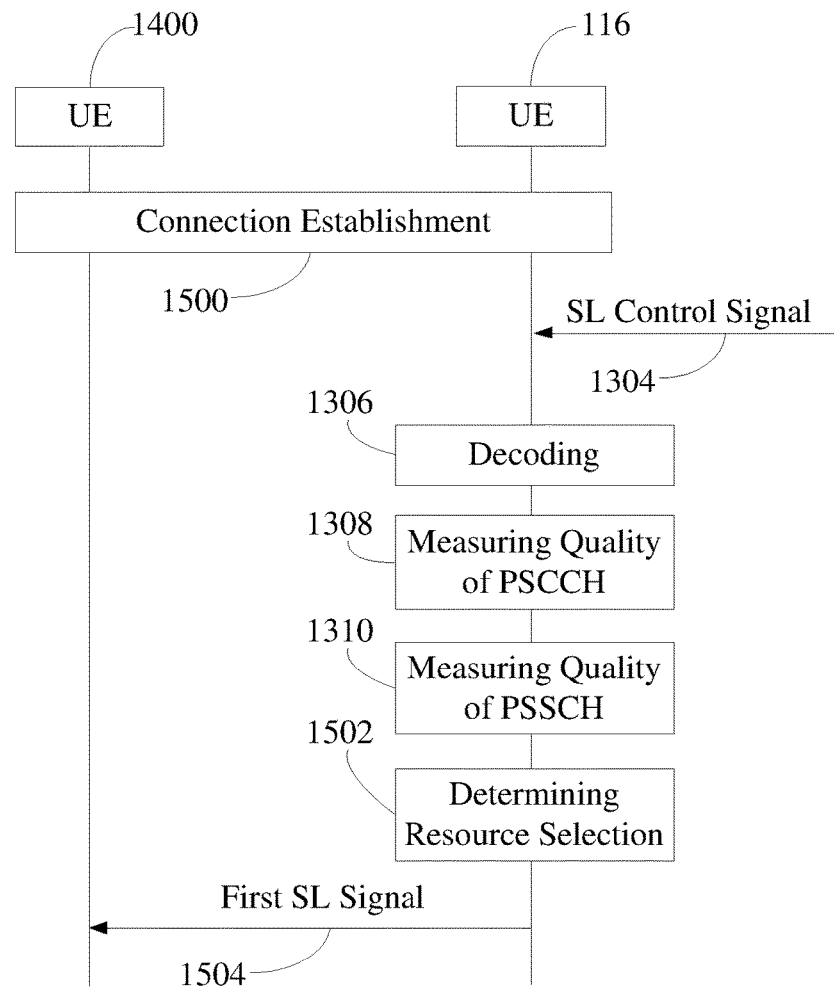
FIG. 15 illustrates an example procedure in a UE expecting to perform an SL communication with a target UE.

In another example scenario as illustrated in FIG. 14 where the UE 116 behind the UE 110 expects to perform a SL communication with a UE 1400, as illustrated in FIG. 15, after a connection establishment procedure 1500 between the UE 116 and the UE 1400, the UE 116 may perform the operations 1306, 1308, and 1310. Assuming that the SL control signal 1304 received includes the SL control signal of the first SL signal transmitted by the UE 110 via the beam 120 in the beam direction 122, then the measured quality in the operation 1308 by the UE 116 may be similar to the measured quality in the operation 1310 by the UE 116.

Further, based on the information on positions of the UE 110, the UE 112, and the UE 1400 relative to the UE 116, the UE 116 may determine that the UE 116 may be within a scope of communication between the UE 110 and the UE 112, the UE 112 may be within a scope of communication between the UE 116 and the UE 1400, and thus reusing the reserved radio resources as indicated by the SL control signal 1304 may result in collision interferences. Thus, in the operation 1502, the reserved radio resources as indicated by the SL control signal 1304 may be excluded by the UE 116 when the UE 116 selects radio resources from the resource pool for the SL communication with the UE 1400.

Then, as illustrated in FIG. 15, the UE 116 may transmit a first SL signal 1504 to its target UE 1400 for example through the transmission beam 1402 as illustrated in FIG. 14 by using the radio resources selected in the operation 1502, without collision interferences with the SL communication between the UE 110 and UE 112.

Figure 16:
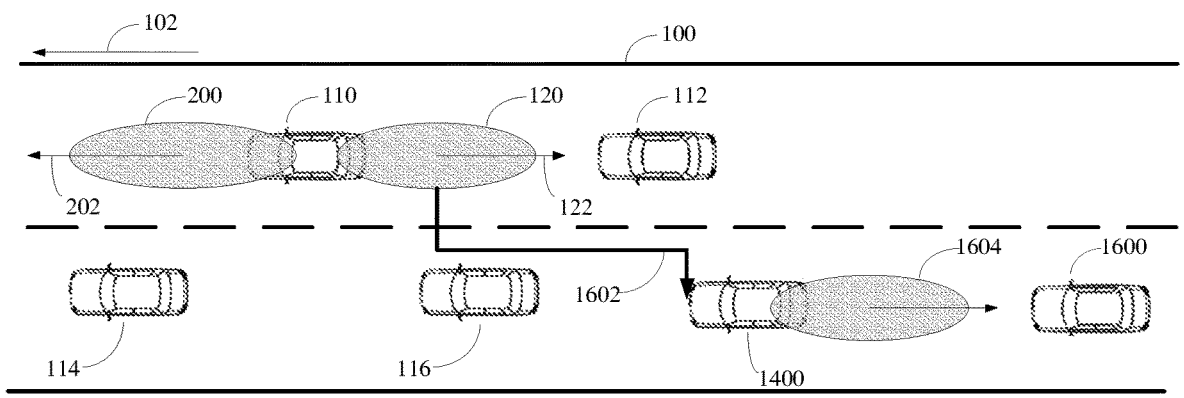
FIG. 16 illustrates an example scenario of SL communication in an embodiment.
Figure 17:
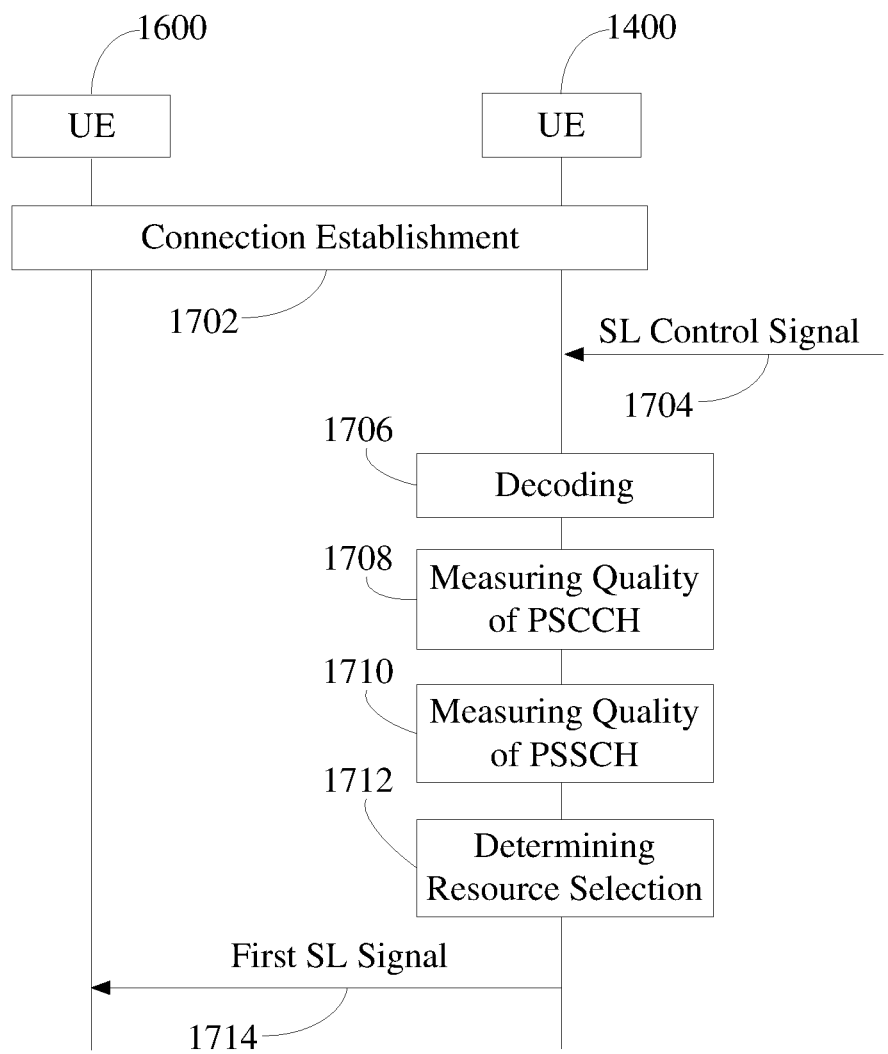
FIG. 17 illustrates an example procedure in a UE expecting to perform an SL communication with a target UE.

In another example scenario as illustrated in FIG. 16 where the UE 1400 behind the UE 116 expects to perform a SL communication with a UE 1600, as illustrated in FIG. 17, after a connection establishment procedure 1702 between the UE 1400 and the UE 1600, the UE 1400 may perform operations 1706, 1708, and 1710 which may be similar to the operations 1306, 1308, and 1310, respectively. Assuming that the SL control signal 1704 received includes the SL control signal of the first SL signal transmitted by the UE 110 via the beam 120 in the beam direction 122, then the measured quality in the operation 1708 by the UE 1400 may be similar to the measured quality in the operation 1710 by the UE 1400.

For example, as illustrated by the arrow 1602 in FIG. 16, the SL control signal of the first SL signal from the UE 110 to the UE 112 through the beamformed transmission 120 may be received by the UE 1400 in FIG. 17.

Further, based on the information on positions of the UE 110, the UE 112, and the UE 1600 relative to the UE 1400, the UE 1400 may determine that both the UE 1400 and the UE 1600 may be outside of a scope of communication between the UE 110 and the UE 112, and thus reusing the reserved radio resources as indicated by the SL control signal 1304 will not result in collision interferences, or will result in low collision interference. Thus, in the operation 1712, the reserved radio resources as indicated by the SL control signal 1304 may be reused by the UE 1400 when the UE 1400 selects radio resources from the resource pool for the SL communication with the UE 1600.

Then, as illustrated in FIG. 17, the UE 1400 may transmit a first SL signal 1714 to its target UE 1600 for example through the transmission beam 1604 as illustrated in FIG. 16 by using the radio resources selected in the operation 1712, without or with low collision interferences with the SL communication between the UE 110 and UE 112.

In the above examples, a transmitting UE performing a SL communication with a target UE may be configured to transmit a first SL signal (including a SL control signal and at least one SL data signal) in a beam direction towards to the target UE, and to transmit a second SL signal (including at least a SL control signal) in a beam direction different from that towards to the target UE.

For a sensing UE performing another SL transmission with a target UE, it may be configured to attempt to sense or receive a SL control signal from a transmitting UE so as to obtain information on the radio resources reserved for a SL communication of the transmitting UE and information on a SL data signal scheduled by the SL control signal. For example depending on one or more factors, such as a direction of the beamformed SL communication being performed or to be performed by the transmitting UE, a direction of the beamformed SL communication to be performed by the sensing UE, relative position relationships between the sensing UE and the transmitting UE, and so on, the SL data signal scheduled by the SL control signal may be an empty signal, a null signal, a dummy signal, or an actual SL data signal. The sensing UE may further measure qualities of both the SL control signal and the SL data signal, regardless of the form and/or contents of the SL data signal, as if the sensing UE receives the SL control and data signals associated with the beamformed SL communication being performed or to be performed by the transmitting UE. For example, if the SL data signal received by the sensing UE is an empty or null signal (e.g. no data signal is actually sensed or received by the sensing UE) or a dummy signal, the quality of the SL data signal received by the sensing UE may be much less than the quality of the SL control signal received by the sensing UE. If the SL data signal received by the sensing UE is the SL data signal associated with the beamformed SL communication being performed or to be performed by the transmitting UE, the quality of the SL data signal received by the sensing UE may be similar to the quality of the SL control signal received by the sensing UE. Thus, based on the two measured qualities, the sensing UE may determine whether the radio resource, which is indicated by the received SL control signal as being reserved for the beamformed SL communication being performed or to be performed by the transmitting UE, may be used for the beamformed SL communication to be performed by the sensing UE.

For example, in an embodiment, the sensing UE may be configured to receive, from a transmitting UE, a SL control signal for first SL transmission (e.g. the SL transmission being performed or to be performed by the transmitting UE) through a first receive beam of a plurality of receive beams, to receive a SL data signal (which may be an empty signal, a null signal, a dummy signal, a SL data signal associated with the SL transmission being performed or to be performed by the transmitting UE, or the like) as scheduled by the SL control signal for the first SL transmission through the first receive beam, to measure both a quality of the received SL control signal and a quality of the received SL data signal, and to select a radio resource for a sidelink transmission by the sensing UE to at least one target UEs based on at least one of the two measured qualities. In different cases, for example in different example scenarios as illustrated above, the received SL control signal may be either a SL control signal of the first SL signal or a SL control signal of the second SL signal. In a case where the received SL control signal is the SL control signal of the second SL signal, the SL data signal received through the receive beam may include one or more dummy SL data signals and/or one or more null signals. Then, the UE expecting to perform the SL transmission with the target UE may be configured to determine a radio resource selection for the SL transmission to the target UE based on the measured qualities. Thus, the radio resource selection may be processed more wisely to mitigate the potential collisions, for example for millimetre wave SL transmissions.

It is appreciated that "reusing a radio resource" herein may including a meaning that the radio resource may be reusable. For example, "a UE may reuse a reserved radio resource" herein may include at least one of "the UE may reuse the reserved radio resource for an expected SL transmission" and "the UE may select freely a radio resource from a resource pool including the reserved radio resource".

Further, it is appreciated that this disclosure is not limited to the above examples, and various modifications, additions, and/or deletions may be made based on the above examples.

For example, in some embodiments, the resource selection may be determined (e.g. in an operation such as the operation 712, 902, 1110, 1312, 1502, or 1712) based on at least one of: the measured quality (e.g. RSRP) of the received SL control signal and the measured quality (e.g. RSRP) of a SL data signal received through the receive beam conveying the received SL control signal, e.g. a difference between the two measured qualities; a direction of the receive beam used for sensing; a direction of the transmit beam used for SL transmission with one or more target UEs; relative position relationships among UEs; and so on.

For example, in an embodiment, in the operation 712, 902, 1110, 1312, 1502, or 1712, the reserved radio resource may be determined as being reusable in case where the measured quality (e.g. RSRP) of the received SL control signal is below a predetermined threshold, or otherwise being excluded from the resource pool In another embodiment, in the operation 712, 902, 1110, 1312, 1502, or 1712, the reserved radio resource may be determined as being reusable in case where the measured quality (e.g. RSRP) of the received SL control signal is above a predetermined threshold, a difference between the above mentioned two measured qualities is above another predetermined threshold, and the SL transmission to the target apparatus is beamformed in a direction different from a direction of the receive beam conveying the received SL control signal.

In another embodiment, in the operation 712, 902, 1110, 1312, 1502, or 1712, the reserved radio resource may be determined as being excluded from the resource pool in case where the measured quality (e.g. RSRP) of the received SL control signal is above a predetermined threshold, and at least one of the following conditions holds: a difference between the above mentioned two measured qualities is below another predetermined threshold; and the SL transmission to the target apparatus is beamformed in a direction similar to a direction of the receive beam conveying the received SL control signal.

Figure 18:
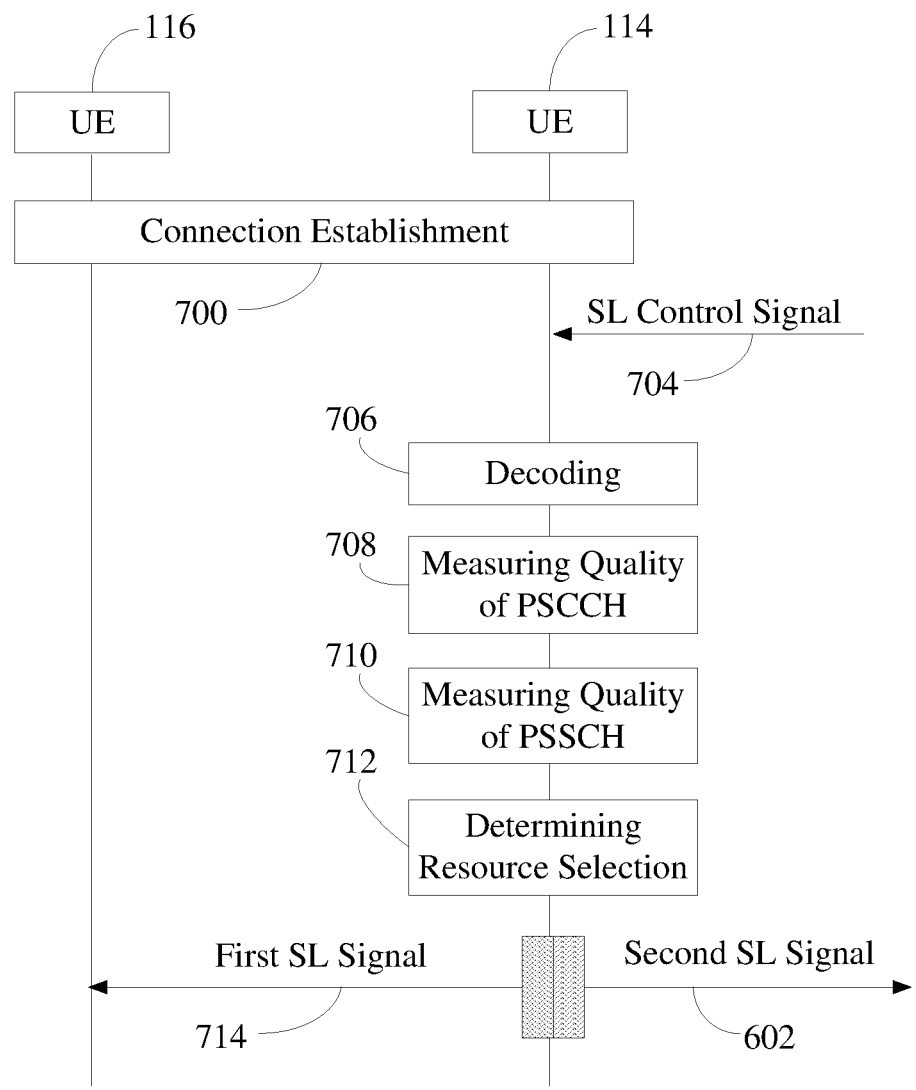
FIG. 18 illustrates an example procedure in a UE expecting to perform an SL communication with a target UE.

Further, any one or more UEs (e.g. the UEs in the above examples) may be one or more operations in different examples described above. For example, as illustrated in FIG. 18, the operations as illustrated in FIG. 6 may be combined with the operations as illustrated in FIG. 7. Thus, the UE 114 may also transmit a second SL signal 602 for example in parallel with the transmission of the first SL signal 714, so that other UEs may determine whether their resource selection may cause potential collisions with for example the millimetre wave SL transmission from the UE 114 to the UE 116.

Further, the configurations of the antenna panels of respective UEs are not limited to the above examples. In another embodiment, a plurality of antenna panels may be configured at any suitable positions in any suitable forms on a UE (e.g. a vehicle), so as to sense/receive and/or transmit/emit beams in any expected directions. For example, two antenna panels may be configured on a UE so that signals through two beams in perpendicular beam directions (with an angle of +/−90°) may be transmitted/emitted and/or received/sensed. Also, beams pointing in different directions can be formed using the same antenna panel but different phase shifts per antenna element.

Figure 19:
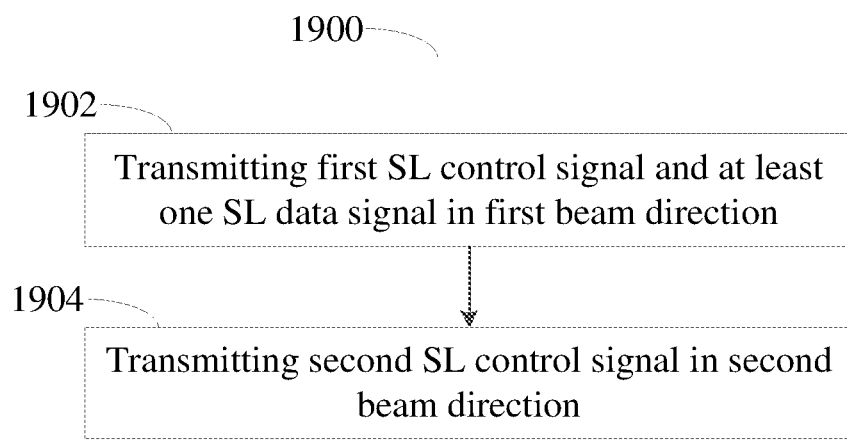
FIG. 19 illustrates an example method for SL radio resource selection in an embodiment.

FIG. 19 illustrates an example method 1900 for SL radio resource selection in an embodiment, which may be performed in a UE performing a beamformed SL transmission to at least one target UE.

As illustrated in FIG. 19, the example method 1900 may include an operation 1902 of transmitting a first SL control signal and at least one SL data signal in a first beam direction, and an operation 1904 of transmitting a second SL control signal in a second beam direction different from the first beam direction. For example, the first SL control signal and the at least one SL data signal may be separated parts of the first SL signal 600 as illustrated in FIG. 6 and may be transmitted separated for example synchronously or asynchronously. In another example, the first SL control signal and the at least one SL data signal may be combined into one signal and may be transmitted as a whole. For example, the second SL control signal may be the SL control signal of the second SL signal 602 as illustrated in FIG. 6.

In some embodiments, the first SL control signal and the second SL control signal may be configured with substantially the same time and frequency resource mapping and transmit power density, for example as illustrated in FIG. 4 or FIG. 5. For example, as illustrated in FIG. 4, the example method 1900 may further include refraining from transmitting a SL data signal associated with the second SL control signal in the second beam direction.

In some embodiments, the example method 1900 may further include transmitting at least one dummy SL data signal in the second beam direction, for example the dummy SL data signal 510 as illustrated in FIG. 5.

In some embodiments, the at least one dummy SL data signal may span at least one sub-channel in a frequency domain, and the at least one sub-channel may include a frequency span of a PSCCH for transmitting the first SL control signal and may be included in a frequency span of a PSSCH for transmitting the at least one SL data signal, for example as illustrated in FIG. 5.

In some embodiments, the transmissions in the first beam direction and the second beam direction may be millimeter wave SL transmissions. In some embodiments, the transmission in the first beam direction may include at least one of a beamformed unicast SL transmission to a target UE and a beamformed groupcast SL transmission to multiple target UEs.

In some embodiments, for example as illustrated in FIG. 4 and FIG. 5, the example method 1900 may further include transmitting a DMRS associated with the second SL control signal in the second beam direction.

Figure 20:
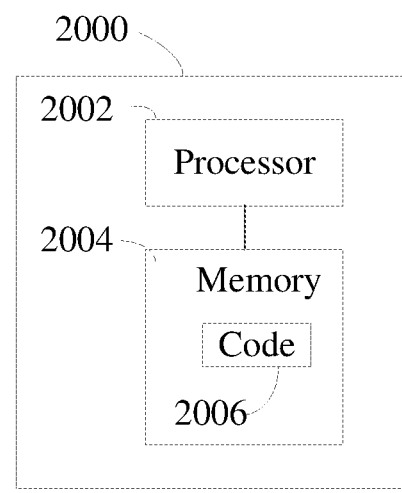
FIG. 20 illustrates an example apparatus for SL radio resource selection in an embodiment.

FIG. 20 illustrates an example apparatus 2000 for SL radio resource selection in an embodiment, an example of which may include a UE performing a beamformed SL transmission to at least one target UE.

As shown in FIG. 20, the example apparatus 2000 may include at least one processor 2002 and at least one memory 2004 that may include computer program code 2006. The at least one memory 2004 and the computer program code 2006 may be configured to, with the at least one processor 2002, cause the apparatus 2000 at least to perform at least the operations of the example method 500 described above.

In various embodiments, the at least one processor 2002 in the example apparatus 2000 may include, but not limited to, at least one hardware processor, including at least one microprocessor such as a central processing unit (CPU), a portion of at least one hardware processor, and any other suitable dedicated processor such as those developed based on for example Field Programmable Gate Array (FPGA) and Application Specific Integrated Circuit (ASIC). Further, the at least one processor 2002 may also include at least one other circuitry or element not shown in FIG. 20.

In various embodiments, the at least one memory 2004 in the example apparatus 2000 may include at least one storage medium in various forms, such as a volatile memory and/or a non-volatile memory. The volatile memory may include, but not limited to, for example, a random-access memory (RAM), a cache, and so on. The non-volatile memory may include, but not limited to, for example, a read only memory (ROM), a hard disk, a flash memory, and so on. Further, the at least memory 2004 may include, but are not limited to, an electric, a magnetic, an optical, an electromagnetic, an infrared, or a semiconductor system, apparatus, or device or any combination of the above.

Further, in various embodiments, the example apparatus 2000 may also include at least one other circuitry, element, and interface, for example at least one I/O interface, at least one antenna element, and the like.

In various embodiments, the circuitries, parts, elements, and interfaces in the example apparatus 2000, including the at least one processor 2002 and the at least one memory 2004, may be coupled together via any suitable connections including, but not limited to, buses, crossbars, wiring and/or wireless lines, in any suitable ways, for example electrically, magnetically, optically, electromagnetically, and the like.

Figure 21:
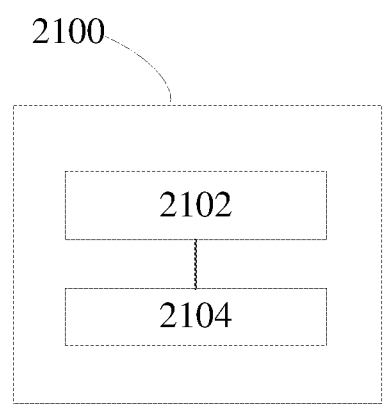
FIG. 21 illustrates an example apparatus for SL radio resource selection in an embodiment.

FIG. 21 illustrates an example apparatus 2100 for SL radio resource selection in an embodiment, an example of which may include a UE performing a beamformed SL transmission to at least one target UE.

As shown in FIG. 21, the example apparatus 2100 may include means for performing operations of the example method 1900 described above in various embodiments. For example, the apparatus 2100 may include means 2102 for performing the operation 1902 of the example method 1900 and means 2104 for performing the operation 1904 of the example method 1900. In one or more another embodiment, at least one I/O interface, at least one antenna element, and the like may also be included in the example apparatus 2100. In some embodiments, examples of means in the apparatus 2100 may include circuitries. In some embodiments, examples of means may also include software modules and any other suitable function entities. In some embodiments, one or more additional means may be included in the apparatus 2100 for performing one or more additional operations of the example method 1900.

The term "circuitry" throughout this disclosure may refer to one or more or all of the following: (a) hardware-only circuit implementations (such as implementations in only analog and/or digital circuitry); (b) combinations of hardware circuits and software, such as (as applicable) (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to one or all uses of this term in this disclosure, including in any claims. As a further example, as used in this disclosure, the term circuitry also covers an implementation of merely a hardware circuit or processor (or multiple processors) or portion of a hardware circuit or processor and its (or their) accompanying software and/or firmware. The term circuitry also covers, for example and if applicable to the claim element, a baseband integrated circuit or processor integrated circuit for a mobile device or a similar integrated circuit in server, a cellular network device, or other computing or network device.

Figure 22:
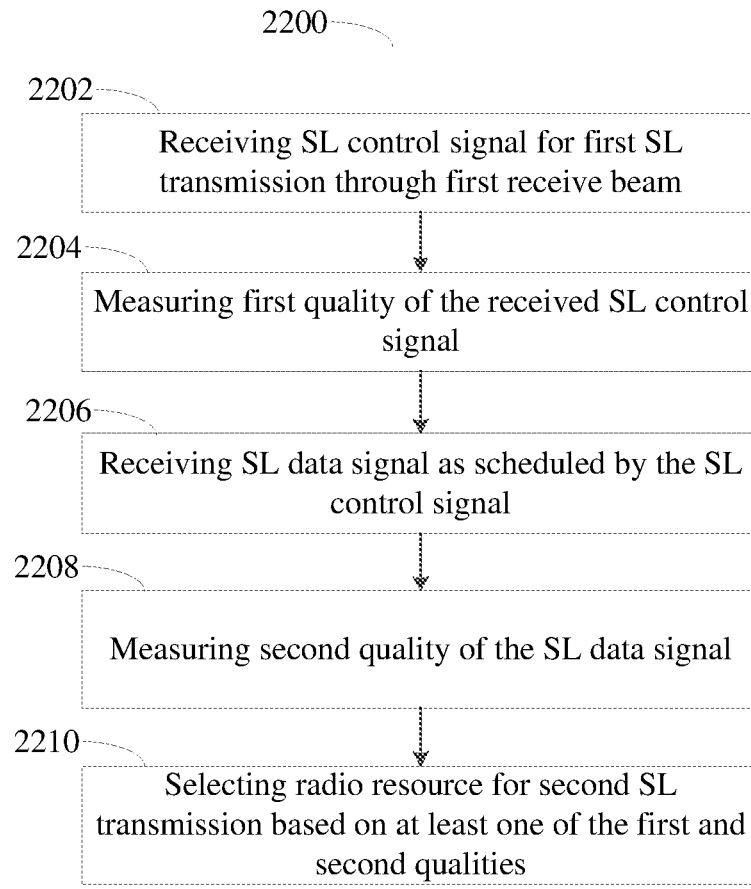
FIG. 22 illustrates an example method for SL radio resource selection in an embodiment.

FIG. 22 illustrates an example method 2200 for SL radio resource selection in an embodiment, which may be performed in an apparatus expecting to perform a beamformed SL transmission to at least one target apparatus.

As illustrated in FIG. 22, the example method 2200 may include an operation 2202 of receive a SL control signal (e.g. the SL control signal 704, or 1304, or 1704, or the like) for a first SL transmission through a first receive beam of a plurality of receive beams, an operation 2204 of measuring a first quality (e.g. RSRP) of the received SL control signal (e.g. the operation 708, the operation 1106, the operation 1308, and the operation 1708 in the above examples), an operation 2206 of receiving a SL data signal as scheduled by the SL control signal for the first SL transmission through the first receive beam, an operation 2208 of measuring a second quality (e.g. RSRP) of the received SL data signal (e.g. the operation 710, the operation 1108, the operation 1310, and the operation 1710 in the above examples), and an operation 2210 of selecting a radio resource selection for a second SL transmission to at least one target apparatus based on at least one of the first quality and the second quality (e.g. the operation 712, the operation 902, the operation 1110, the operation 1312, the operation 1502, and the operation 1712 in the above examples).

In the example method 2200, for example in different example scenarios such as those illustrated above, the received SL control signal may be either a SL control signal of the first SL signal or a SL control signal of the second SL signal, and the SL data signal received through the first receive beam may be scheduled by the received SL control signal. In a case where the received SL control signal is the SL control signal of the second SL signal, the SL data signal received through the first receive beam may include one or more dummy SL data signals and/or one or more null signals.

In some embodiments, selecting the radio resource for the second SL transmission may include at least one of: reusing a radio resource reserved by the SL control signal for the first SL transmission in a case where the first quality is below a first threshold; and selecting another radio resource different from the reserved radio resource in a case where the first quality is above the first threshold. For example, radio resource reserved by the SL control signal for the first SL transmission may be reused for the second SL transmission in a case where the first quality is below a first threshold, and otherwise another radio resource different from the reserved radio resource may be selected for the second SL transmission.

In some embodiments, in a case where the first quality is above the first threshold, selecting the radio resource for the second SL transmission may further include at least one of: reusing the radio resource reserved by the SL control signal for the first SL transmission in a case where a difference between the first quality and the second quality is above a second threshold and the second SL transmission is beamformed in a direction different from a direction of the first receive beam; and selecting another radio resource different from the reserved radio resource in at least one of a case where the second SL transmission is beamformed in a direction similar to a direction of the first receive beam, and a case where a difference between the first quality and the second quality is below a second threshold. For example, the radio resource reserved by the SL control signal for the first SL transmission may be reused for the second SL transmission in a case where a difference between the first quality and the second quality is above a second threshold and the second SL transmission is beamformed in a direction different from a direction of the first receive beam, and otherwise another radio resource different from the reserved radio resource may be selected for the second SL transmission. For example, the direction of the beamformed second sidelink transmission may be different from the direction of the first receive beam in a case where an antenna panel for performing the beamformed second sidelink transmission and an antenna panel for receiving the first receive beam are configured to point in different directions, and/or the direction of the beamformed second sidelink transmission may be similar to the direction of the first receive beam in a case where an antenna panel for performing the beamformed second sidelink transmission and an antenna panel for receiving the first receive beam are configured to point in similar directions.

In some embodiments, selecting the radio resource for the second sidelink transmission may further be based on relative positions of an apparatus transmitting the SL control signal and the at least one target apparatus.

In some embodiments, the second SL transmission and receptions of the SL control signal and the SL data signal may be millimeter wave SL communications.

In some embodiments, the second SL transmission may include at least one of a beamformed unicast SL transmission to the at least one target apparatus and a beamformed groupcast SL transmission to the at least one target apparatus.

Figure 23:
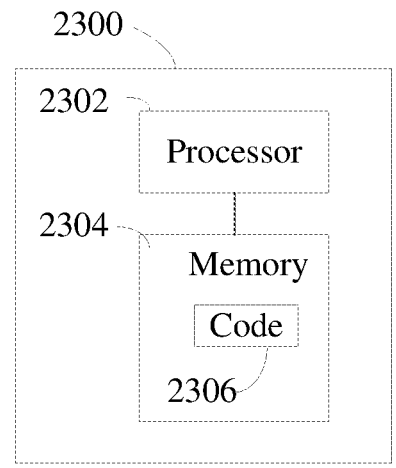
FIG. 23 illustrates an example apparatus for SL radio resource selection in an embodiment.

FIG. 23 illustrates an example apparatus 2300 for SL radio resource selection in an embodiment, which may be performed in an apparatus expecting to perform a beamformed SL transmission to at least one target apparatus. An example of the example apparatus 2300 may include a UE expecting to perform a beamformed SL transmission to at least one target UE.

As shown in FIG. 23, the example apparatus 2300 may include at least one processor 2302 and at least one memory 2304 that may include computer program code 2306. The at least one memory 2304 and the computer program code 2306 may be configured to, with the at least one processor 2302, cause the apparatus 2300 at least to perform at least the operations of the example method 2200 described above.

In various embodiments, the at least one processor 2302 in the example apparatus 2300 may include, but not limited to, at least one hardware processor, including at least one microprocessor such as a CPU, a portion of at least one hardware processor, and any other suitable dedicated processor such as those developed based on for example FPGA and ASIC. Further, the at least one processor 2302 may also include at least one other circuitry or element not shown in FIG. 23.

In various embodiments, the at least one memory 2304 in the example apparatus 2300 may include at least one storage medium in various forms, such as a volatile memory and/or a non-volatile memory. The volatile memory may include, but not limited to, for example, a RAM, a cache, and so on. The non-volatile memory may include, but not limited to, for example, a ROM, a hard disk, a flash memory, and so on. Further, the at least memory 2304 may include, but are not limited to, an electric, a magnetic, an optical, an electromagnetic, an infrared, or a semiconductor system, apparatus, or device or any combination of the above.

Further, in various embodiments, the example apparatus 2300 may also include at least one other circuitry, element, and interface, for example at least one I/O interface, at least one antenna element, and the like.

In various embodiments, the circuitries, parts, elements, and interfaces in the example apparatus 2300, including the at least one processor 2302 and the at least one memory 2304, may be coupled together via any suitable connections including, but not limited to, buses, crossbars, wiring and/or wireless lines, in any suitable ways, for example electrically, magnetically, optically, electromagnetically, and the like.

Figure 24:
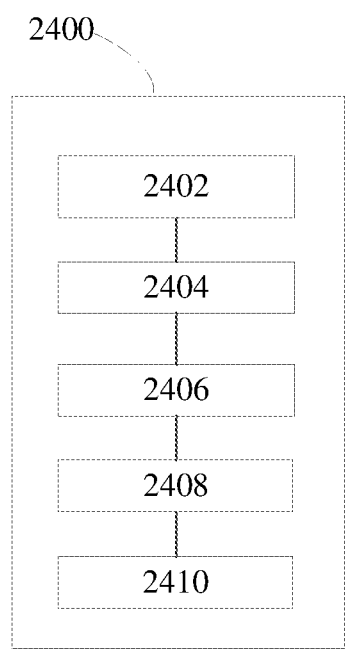
FIG. 24 illustrates an example apparatus for SL radio resource selection in an embodiment.

FIG. 24 illustrates an example apparatus 2400 for SL radio resource selection in an embodiment, which may be performed in an apparatus expecting to perform a beamformed SL transmission to at least one target apparatus. An example of the example apparatus 2400 may include a UE expecting to perform a beamformed SL transmission to at least one target UE.

As shown in FIG. 24, the example apparatus 2400 may include means for performing operations of the example method 2200 described above in various embodiments. For example, the apparatus 2400 may include means 2402 for performing the operation 2202 of the example method 2200, means 2404 for performing the operation 2204 of the example method 2200, means 2406 for performing the operation 2206 of the example method 2200, means 2408 for performing the operation 2208 of the example method 2200, and means 2410 for performing the operation 2210 of the example method 2200. In one or more another embodiment, at least one I/O interface, at least one antenna element, and the like may also be included in the example apparatus 2400. In some embodiments, examples of means in the apparatus 2400 may include circuitries. In some embodiments, examples of means may also include software modules and any other suitable function entities. In some embodiments, one or more additional means may be included in the apparatus 2400 for performing one or more additional operations of the example method 2200.

Another example embodiment may relate to computer program codes or instructions which may cause an apparatus to perform at least respective methods described above. Another example embodiment may be related to a computer readable medium having such computer program codes or instructions stored thereon. In some embodiments, such a computer readable medium may include at least one storage medium in various forms such as a volatile memory and/or a non-volatile memory. The volatile memory may include, but not limited to, for example, a RAM, a cache, and so on. The non-volatile memory may include, but not limited to, a ROM, a hard disk, a flash memory, and so on. The non-volatile memory may also include, but are not limited to, an electric, a magnetic, an optical, an electromagnetic, an infrared, or a semiconductor system, apparatus, or device or any combination of the above.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While some embodiments have been described, these embodiments have been presented by way of example, and are not intended to limit the scope of the disclosure. Indeed, the apparatus, methods, and systems described herein may be embodied in a variety of other forms; furthermore, various omissions, substitutions and changes in the form of the methods and systems described herein may be made without departing from the spirit of the disclosure. For example, while blocks are presented in a given arrangement, alternative embodiments may perform similar functionalities with different components and/or circuit topologies, and some blocks may be deleted, moved, added, subdivided, combined, and/or modified. At least one of these blocks may be implemented in a variety of different ways. The order of these blocks may also be changed. Any suitable combination of the elements and acts of the some embodiments described above can be combined to provide further embodiments. The accompanying claims and their equivalents are intended to cover such forms or modifications as would fall within the scope and spirit of the disclosure.

What is claimed is:

1. An apparatus comprising:
   at least one processor; and
   at least one memory including computer program code, the at least one memory and the computer program code being configured to, with the at least one processor, cause the apparatus to:
   transmit a first sidelink control signal and at least one sidelink data signal in a first beam direction, and
   transmit a second sidelink control signal in a second beam direction different from the first beam direction,
   wherein the at least one memory and the computer program code is configured to, with the at least one processor, further cause the apparatus to perform one of the following:
   refrain from transmitting a sidelink data signal associated with the second sidelink control signal in the second beam direction; or transmit a dummy sidelink data signal associated with the second sidelink control signal in the second beam direction,
   wherein the dummy sidelink data signal spans at least one sub-channel in a frequency domain, the at least one sub-channel including a frequency span of a physical sidelink control channel for transmitting the first sidelink control signal and being included in a frequency span of a physical sidelink shared channel for transmitting the at least one sidelink data signal.

2. The apparatus of claim 1, wherein the first sidelink control signal and the second sidelink control signal are configured with substantially the same time and frequency resource mapping and transmit power density.

3. The apparatus of claim 1, wherein no demodulation reference signal is associated with the dummy sidelink data signal.

4. The apparatus of claim 1, wherein the second sidelink control signal includes substantially the same information as the first sidelink control signal.

5. The apparatus of claim 1, wherein the transmissions in the first beam direction and the second beam direction are millimeter wave sidelink transmissions,
   and wherein the transmission in the first beam direction includes at least one of a beamformed unicast sidelink transmission to a target apparatus and a beamformed groupcast sidelink transmission to multiple target apparatuses.

6. An apparatus, comprising:
   at least one processor; and
   at least one memory including computer program code, the at least one memory and the computer program code being configured to, with the at least one processor, cause the apparatus to:
   receive a sidelink control signal for a first sidelink transmission through a first receive beam of a plurality of receive beams,
   measure a first quality of the received sidelink control signal,
   receive a sidelink data signal as scheduled by the sidelink control signal for the first sidelink transmission through the first receive beam,
   measure a second quality of the received sidelink data signal, and
   select a radio resource for a second sidelink transmission by the apparatus to at least one target apparatus based on at least one of the first quality and the second quality,
   wherein selecting the radio resource for the second sidelink transmission comprises:
   reusing a radio resource reserved by the sidelink control signal for the first sidelink transmission in a case where the first quality is below a first threshold; else
   selecting another radio resource different from the reserved radio resource.

7. The apparatus of claim 6 wherein, in a case where the first quality is above the first threshold, selecting the radio resource for the second sidelink transmission further comprises:
   reusing a radio resource reserved by the sidelink control signal for the first sidelink transmission in a case where a difference between the first quality and the second quality is above a second threshold and the second sidelink transmission is beamformed in a direction different from a direction of the first receive beam; else
   selecting another radio resource different from the reserved radio resource.

8. The apparatus of claim 6, wherein selecting the radio resource for the second sidelink transmission is further based on relative positions of an apparatus transmitting the sidelink control signal and the at least one target apparatus.

9. The apparatus of claim 6, wherein the second sidelink transmission and receptions of the sidelink control signal and the sidelink data signal are millimeter wave sidelink communications, and wherein the second sidelink transmission comprises at least one of a beamformed unicast sidelink transmission to the at least one target apparatus and a beamformed groupcast sidelink transmission to the at least one target apparatus.

10. The apparatus of claim 6, wherein the first quality and the second quality are reference signal received powers measured over demodulation reference signals associated with the sidelink control signal and the sidelink data signal, respectively.

11. A method, comprising:
transmitting a first sidelink control signal and at least one sidelink data signal in a first beam direction; and
transmitting a second sidelink control signal in a second beam direction different from the first beam direction,
wherein the method further comprises one of the following:
refraining from transmitting a sidelink data signal associated with the second sidelink control signal in the second beam direction; or
transmitting a dummy sidelink data signal associated with the second sidelink control signal in the second beam direction,
wherein the transmissions in the first beam direction and the second beam direction are millimeter wave sidelink transmissions,
and wherein the transmission in the first beam direction includes at least one of a beamformed unicast sidelink transmission to a target apparatus and a beamformed groupcast sidelink transmission to multiple target apparatuses.

12. The method of claim 11, wherein the first sidelink control signal and the second sidelink control signal are configured with substantially the same time and frequency resource mapping and transmit power density.

13. The method of claim 11, wherein the dummy sidelink data signal spans at least one sub-channel in a frequency domain, the at least one sub-channel including a frequency span of a physical sidelink control channel for transmitting the first sidelink control signal and being included in a frequency span of a physical sidelink shared channel for transmitting the at least one sidelink data signal.

14. The method of claim 11, wherein no demodulation reference signal is associated with the dummy sidelink data signal.

15. The method of claim 11, wherein the second sidelink control signal includes substantially the same information as the first sidelink control signal.

16. A non-transitory computer readable medium comprising instructions stored thereon for causing an apparatus to perform the method of claim 11.

17. A method, comprising:
receiving a sidelink control signal for a first sidelink transmission through a first receive beam of a plurality of receive beams;
measuring a first quality of the received sidelink control signal;
receiving a sidelink data signal as scheduled by the sidelink control signal for the first sidelink transmission through the first receive beam;
measuring a second quality of the received sidelink data signal; and
selecting a radio resource for a second sidelink transmission to at least one target apparatus based on at least one of the first quality and the second quality,
wherein, in a case where the first quality is above the first threshold, selecting the radio resource for the second sidelink transmission further comprises:
reusing a radio resource reserved by the sidelink control signal for the first sidelink transmission in a case where a difference between the first quality and the second quality is above a second threshold and the second sidelink transmission is beamformed in a direction different from a direction of the first receive beam; else
selecting another radio resource different from the reserved radio resource.

18. The method of claim 17, wherein selecting the radio resource for the second sidelink transmission comprises:
reusing a radio resource reserved by the sidelink control signal for the first sidelink transmission in a case where the first quality is below a first threshold; else
selecting another radio resource different from the reserved radio resource.

19. The method of claim 17, wherein selecting the radio resource for the second sidelink transmission is further based on relative positions of an apparatus transmitting the sidelink control signal and the at least one target apparatus.

20. The method of claim 17, wherein the second sidelink transmission and receptions of the sidelink control signal and the sidelink data signal are millimeter wave sidelink communications,
and wherein the second sidelink transmission comprises at least one of a beamformed unicast sidelink transmission to the at least one target apparatus and a beamformed groupcast sidelink transmission to the at least one target apparatus.

21. The method of claim 17, wherein the first quality and the second quality are reference signal received powers measured over demodulation reference signals associated with the sidelink control signal and the sidelink data signal, respectively.

22. A non-transitory computer readable medium comprising instructions stored thereon for causing an apparatus to perform the method of claim 17.

* * * * *